(12) United States Patent
Gluck et al.

(10) Patent No.: US 11,913,820 B2
(45) Date of Patent: Feb. 27, 2024

(54) SYSTEMS AND METHODS FOR TANK LEVEL MONITORING

(71) Applicant: Cox Communications, Inc., Atlanta, GA (US)

(72) Inventors: Ilan Gluck, Atlanta, GA (US); Peyton Riley, Atlanta, GA (US); Altan Stalker, Atlanta, GA (US); Kavita Parihar, Atlanta, GA (US); Lauren Douglas, Atlanta, GA (US); John Kiernan, Atlanta, GA (US); Eric Lescourret, Alpharetta, GA (US); Matt Shorts, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 17/929,391

(22) Filed: Sep. 2, 2022

(65) Prior Publication Data
US 2023/0060411 A1 Mar. 2, 2023

Related U.S. Application Data

(60) Provisional application No. 63/240,198, filed on Sep. 2, 2021.

(51) Int. Cl.
*G01F 23/00* (2022.01)
*G08B 21/18* (2006.01)

(52) U.S. Cl.
CPC ....... *G01F 23/0007* (2013.01); *G08B 21/182* (2013.01)

(58) Field of Classification Search
CPC .......................... G01F 23/0007; G08B 21/182
See application file for complete search history.

(56) References Cited

U.S. PATENT DOCUMENTS

| | | | | |
|---|---|---|---|---|
| 7,583,198 B2 * | 9/2009 | Kates | ..................... | G08B 19/00 340/573.6 |
| 2006/0267756 A1 * | 11/2006 | Kates | ................... | G08B 21/182 340/521 |
| 2016/0223382 A1 * | 8/2016 | Luber | ................. | G01F 23/0007 |
| 2016/0377474 A1 * | 12/2016 | Stillman | ................. | G01F 23/74 340/618 |
| 2017/0045007 A1 * | 2/2017 | Pursifull | .......... | B60K 15/03504 |
| 2017/0200362 A1 * | 7/2017 | McBride | ................ | H04L 67/12 |
| 2020/0391992 A1 * | 12/2020 | Bills | ....................... | G07F 15/04 |
| 2022/0356826 A1 * | 11/2022 | Dea | .................... | B01D 53/9431 |

* cited by examiner

Primary Examiner — Ojiako K Nwugo
(74) Attorney, Agent, or Firm — Eversheds Sutherland (US) LLP

(57) ABSTRACT

Systems and methods are disclosed for tank level monitoring. To perform monitoring of fuel levels of fuel tanks, tank level monitor devices may be affixed to the fuel tanks. The tank level monitors may be used to provide data relating to the fuel tanks to a remote location (such as a mobile device application). A predictive algorithm may also be implemented to more effectively schedule refueling events for various fuel tanks.

13 Claims, 27 Drawing Sheets

410 ⬎

411

HOME

TANKS    DEVICES    TECHNICIANS

| Total Tanks | Total Technicians | Total Gallons Sold(YTD) |
|---|---|---|
| 3781 | 40 | 71,463 |

REFILLS COMPLETED
☒ Propane (YTD: 5780) ☒ Diesel (YTD: 5080) ☐ Total (YTD: 10,860)
Num

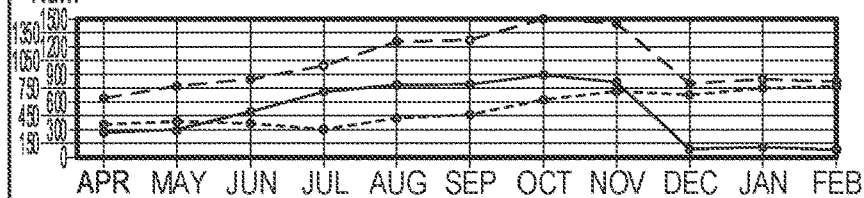

APR MAY JUN JUL AUG SEP OCT NOV DEC JAN FEB

GALLONS SOLD
☒ Propane (YTD: 25987) ☒ Diesel (YTD: 97450) ☐ Total (YTD: 71,463)
Gallons

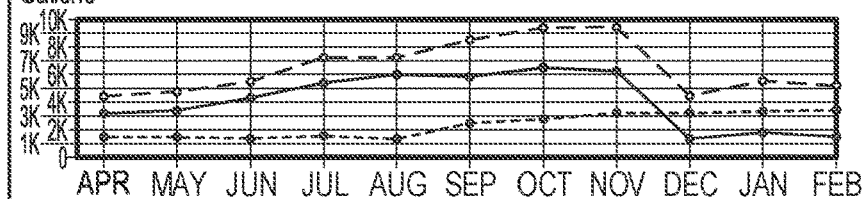

APR MAY JUN JUL AUG SEP OCT NOV DEC JAN FEB

FUEL TYPE
▌Propane
▌72%
▌2722 Tanks
▌Diesel
▌28%
▌1059 Tanks

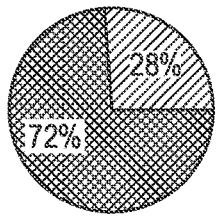

TANK ALERTS
▌1-5 Days
▌3%
▌113 Tanks
▌6-10 Days
▌5%
▌189 Tanks
▌11-15 Days
▌8%
▌302 Tanks
▌16+ Days
▌84%
▌3176 Tanks

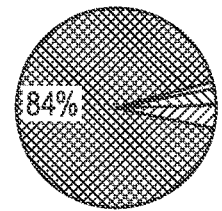

< ALL TANKS

Tank 2351    [See on map] ○○○

| Total Refills | Refills YTD | Gallons Used | Gallons Used(YTD) |
|---|---|---|---|
| 45 | 10 | 11,892 | 2761 |

Tank 2351    ○○○
6 DAYS UNTIL EMPTY
Fill(%)    25%

Last Fill:    02/01/2021
   15 Days Ago

FUEL USAGE
Fill(%)
2/1 2/2 2/3 2/4 2/5 2/6 2/7 2/8 2/9 2/10 2/11 2/12 2/13 2/14 2/15 2/16 2/17 2/18

AVERAGE TIME BETWEEN REFILLS
Days
APR MAY JUN JUL AUG SEP OCT NOV DEC JAN FEB

CLIENT INFORMATION
Client Name:    Jimmy Dean
Client Type:    Residential Home
Preferred Communication:    Phone Phone:    (123) 456 - 7891

```
┌─────────────────────────────────────────────────────────────┐
│ Receiving, by a remote server and from a first tank level   │
│ monitor (TLM) device disposed on a first fuel tank and at a │─ 2002
│ first time, a first fuel level of the first fuel tank       │
└─────────────────────────────────────────────────────────────┘
                              ↓
┌─────────────────────────────────────────────────────────────┐
│ Receiving, from a second TLM device disposed on a second    │─ 2004
│ fuel tank, a second fuel level of the second fuel tank      │
└─────────────────────────────────────────────────────────────┘
                              ↓
┌─────────────────────────────────────────────────────────────┐
│ Determining that the first fuel level is less than or equal │
│ to a threshold fuel level and the second fuel level is      │─ 2006
│ above the threshold fuel level                              │
└─────────────────────────────────────────────────────────────┘
                              ↓
┌─────────────────────────────────────────────────────────────┐
│ Automatically generating, a refueling schedule associated   │─ 2008
│ with that includes the first fuel tank instead of the       │
│ second fuel tank                                            │
└─────────────────────────────────────────────────────────────┘
```

FIG. 20

SYSTEMS AND METHODS FOR TANK LEVEL MONITORING

CROSS-REFERENCE TO RELATED APPLICATIONS

This application claims priority to U.S. Provisional Application No. 63/240,198, filed Sep. 2, 2021, which is incorporated herein by reference.

BACKGROUND

Fuel tanks may be used in a variety of contexts. For example, in the farming context, fuel tanks may be used for purposes of keeping crops warm through the winter, or drying grain after it has been harvested and before it goes into storage (to prevent mold, mildew, etc.). In the absence of a device that may be used to monitor a fuel level of the fuel tank(s), the owners and/or operators may be required to manually monitor fuel levels in order to prevent situations where a particular fuel tank runs out of fuel (or falls below a threshold amount of fuel). A situation where a fuel tank runs out of fuel may severely disrupt the operations of a commercial business and/or cause the owner and/or operator of the fuel tank to pay a premium for an emergency fuel delivery. To avoid such situations, many owners and/or operators will schedule fuel refills for the fuel tanks even before the refills are necessary (to avoid a scenario where a fuel level might drop below the threshold level). Although this approach may ensure that the fuel levels remain sufficient, it may not be the most efficient refueling approach.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and may not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 4A-4E depict example user interfaces for a mobile device application, in accordance with one or more example embodiments of the disclosure.

FIG. 6 depicts an example user interface for a predictive algorithm, in accordance with one or more example embodiments of the disclosure.

FIG. 20 depicts a schematic illustration of an example method, in accordance with one or more example embodiments of the disclosure.

DETAILED DESCRIPTION

Figure 1:
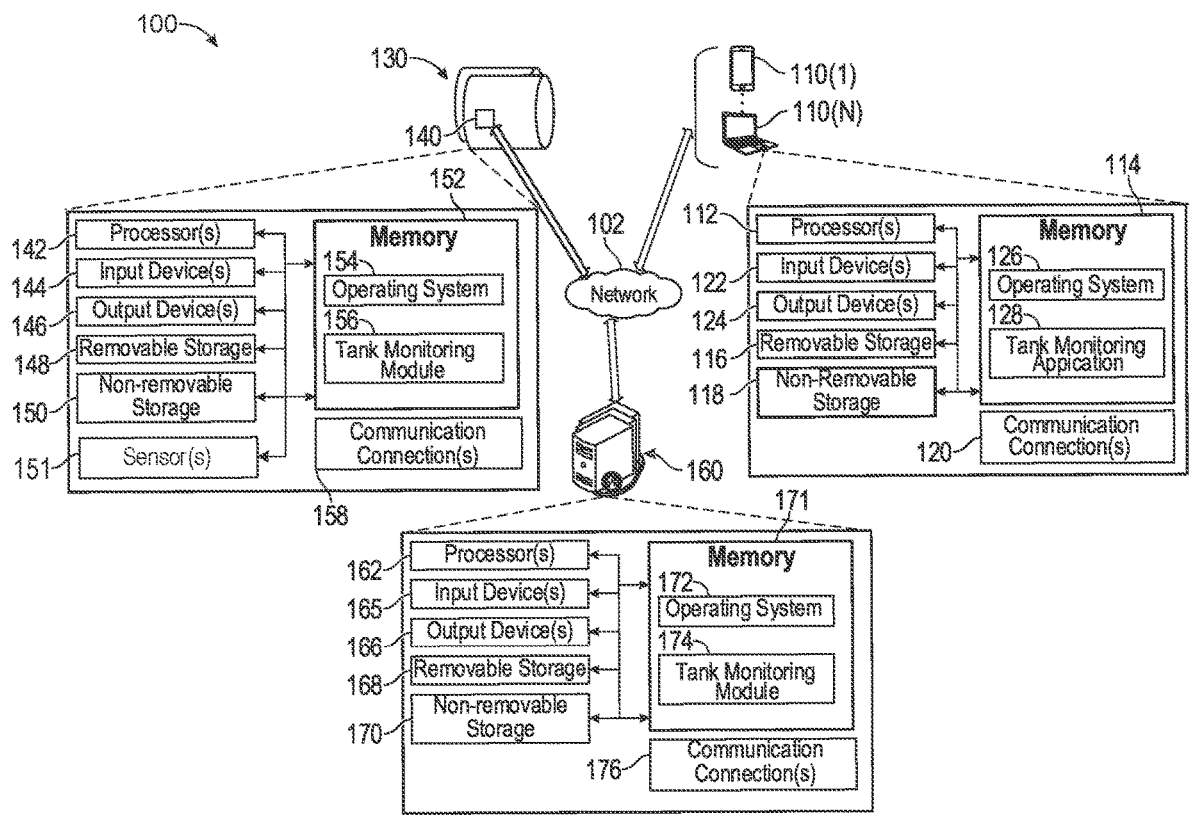
FIG. 1 depicts a schematic illustration of an example system, in accordance with one or more example embodiments of the disclosure.

This disclosure generally relates to, among other things, systems and methods for tank level monitoring. Particularly, the systems and methods may involve the use of one or more devices (which may be referred to herein as "tank level monitors," "tank level monitor (TLM) devices," "devices," or the like) that may be used in association with fuel tanks to track the fuel levels (among other information) of the fuel tanks and relay this information to a remote location. For consistency sake, the fuel tanks described herein may primary be described as fuel tanks used in farming contexts, however, the systems and methods described herein may similarly be applied to fuel tanks used in any other context as well.

In one or more embodiments, a tank level monitor may be a device that may enable a user to track data associated with any number of given fuel tanks. For example, a tank level monitor may be affixed to a single fuel tank and may capture data relating to the fuel tank, such as a current fuel level of the fuel tank. The tank level monitor also does not necessarily need to be physically coupled to a fuel tank, and may capture data for multiple fuel tanks at the same time. The tank level monitor may provide fuel marketers and owners/operators of fuel tanks the ability to remotely view the fill levels of their tanks (among other information). A tank level monitor software platform may allow the data captured by the tank level monitor to be communicated to a remote location, such as a mobile device application of a user or a desktop dashboard, as well as any other remote system. The software platform may also include a predictive algorithm that may provide predictive information about how the fuel levels of a given fuel tank may change in the future. For example, the tank level monitor may be capable of estimating a remaining number of days until a given fuel tank is empty or has less than a threshold amount of fuel. The predictive algorithm may also consider other factors, and may allow for the optimization of refueling scheduling for any of the fuel tanks.

In one or more embodiments, the systems and methods described herein may provide a number of advantages. For example, the tank level monitors may serve to optimize fuel delivery operations. Monitoring fuel levels remotely allows the fuel marketers to optimize delivery schedules and routes. Any refueling event scheduling and routing may also be performed automatically by the software platform. Additionally, the software platform used in association with the tank level monitors allows the fuel levels of the fuel tanks to be remotely monitored. The software platform may also provide threshold alerts. For example, the software platform may generate alerts when a fuel tanks reaches a pre-defined threshold (for example, 20% remaining fuel).

The software platform may also provide a prediction of an amount of time until a given fuel tank will be empty (or below the threshold fuel level). The predictive algorithm may be based on historical consumption of a particular tank. The platform may also provide a listing of priority tanks to fill based on projected days to empty and/or a listing of devices that have an existing error. There are huge gains to be achieved by reducing the number of refueling deliveries, by extending the amount of time in between refills and consuming more of a tank's capacity before performing a subsequent refill. There's also the advantage of centralized visibility so that more informed decisions may be made by fuel tank owners/operations. Currently, a farmer who has responsibility for operations across many different physical locations may have to go out and manually check those fuel tank levels in order to make a decision about refills, so providing this data remotely enables the avoidance of that manual effort.

Turning to the device itself, in one or more embodiments, the tank level monitor may be configured to be affixed directly to a fuel tank. To accomplish this, the bottom of the tank level monitor (or any other portion of the tank level monitor) may be equipped with magnets that may allow the tank level monitor to be affixed to the fuel tank. The tank level monitor may be mounted on top of the fuel tank using the magnets at the bottom of the tank level monitor, or may be mounted to any other location of the fuel tank. In some cases, the tank level monitor may also include a curved base that may allow the tank level monitor to be form-fitting with the shape of the fuel tank. The tank level monitor may also be affixed to the fuel tank in any other manner as well (for example, using an adhesive, a bolt, etc.). Additionally, in some cases, the tank level monitor may not necessarily be affixed to a fuel tank, but rather may be in the vicinity of the fuel tank.

The tank level monitor may be a battery-powered device, or may draw power directly from the fuel tank or any other external power source. The tank level monitor may also be waterproof and certified for use in extreme conditions, such as areas where explosive gases may be present (for example, within the fuel tank). In some cases, the tank level monitor may be connected to any remote systems (for example, a remote server, mobile device, etc.) via wireless connectivity, such as cellular. The tank level monitor may also include a dual subscriber identity module (SIM). That is, the tank level monitor may include multiple SIM cards (which may also include eSIM cards, and/or any other variation of SIM cards) so that the device may select whichever carrier has the stronger signal in a given location. To this end, the tank level monitor may include a two-part plastic enclosure with a round base and a part sticking up where one or more antennae may be housed. The tank level monitor may also include connectivity through any other wireless and/or wired communication protocols other than cellular as well, such as Bluetooth. Furthermore, in some cases, if the tank level monitor itself is unable to connect to a long-range network, such as a cellular network, it may transmit data to another device that is connected to such a network. For example, if there is a user mobile device within short-range communication range of the tank level monitor, then the tank level monitor may transmit the data to the mobile device, and the mobile device may then provide the data to the software platform.

In one or more embodiments, the tank level monitor may also include one or more indicators to provide information about the status of the tank level monitor to a user. As one non-limiting example, the indicators may include LEDs incorporated into the tank level monitor that may be visible to a user. For example, the LEDs may provide the user with a confirmation that the tank level monitor was properly installed and activated in association with a fuel tank. The indicators may also provide other information, such as network connectivity status, if the tank level monitor is currently receiving data from a fuel tank, etc. These indicators may also be provided as virtual indicators through an interface of the mobile device application and/or desktop dashboard as well. Additionally, in some cases, the indicators may be in any other form other than LEDs, such as a display on the tank level monitor that may be capable of presenting text, graphics, an auditory message, etc.

In one or more embodiments, the tank level monitor may also include any number of different types of sensors as well. For example, the tank level monitor may include a wind sensor and/or a temperature sensor to capture information about an environment external to the fuel tank (which may be used by the predictive algorithm as described below). The tank level monitor may also include a GPS to provide location information about the fuel tank and/or tank level monitor. The tank level monitor may also include an accelerometer that may be used to detect when the device is removed (for example, stolen) from the fuel tank. The tank level monitor may also include a sensor to detect a current battery level or power level of the tank level monitor. The tank level monitor may also include any other type of sensor as well, such as, for example, lidar, radar, ultrasonic sensor, or any other type of sensor.

In one or more embodiments, once installed, the tank level monitor may capture data relating to the fuel level of the fuel tank. The tank level monitor may capture this data through any number of methods. For example, the tank level monitor may obtain fuel tank levels from an existing fuel gauge on the fuel tank. The tank level monitor may also include one or more cameras (or other types of sensors) that may detect the existing fuel levels in the fuel tank. Once obtained, the data may be transmitted through any number of wireless or wired communication protocols. The tank level monitor may also capture and transmit any other types of data relating to the fuel tank or otherwise. For example, the tank level monitor may capture identifying information associated with the fuel tank, a GPS location of the fuel tank, whether the fuel tank or tank level monitor is malfunctioning, or any other data that may be collected by the fuel tank monitor. The tank level monitor may also capture data relating to the external environment (for example, using any of the sensors described above, or any other types of sensors). For example, the tank level monitor may obtain temperature readings, wind readings, or any other types of data. Any of this data may be transmitted to the software platform to be used for any number of given purposes. For example, providing as much raw data as possible may be useful for the predictive algorithm (described in additional detail below) in making determinations about the status of various fuel tanks and when refueling events should be scheduled.

In one or more embodiments, the tank level monitor may periodically transmit any of the aforementioned data (or any other types of data). For example, the tank level monitor may transmit data in twelve hour increments, or at any other increment. These increments may be manually set by a user or may be automatically determined by the software platform. The increments may also be adjustable and dynamic. For example, if the software platform determines that data associated with a given fuel tank is more critical, the time frame in between increments may be lowered. Additionally, in some cases, data may be transmitted upon request from a user. In further cases, data may be transmitted upon certain triggering events (for example, when a fuel level crosses a certain threshold). These types of reporting events may be manually set by a user, or may be determined automatically based on any number of factors. For example, the device may determine that a fuel tank is likely to cross below a threshold within the next few hours, and a refueling truck is already scheduled to be in the area to refill other fuel tanks. The device may provide an alert to indicate that the refueling truck should be routed to fill the particular fuel tank as well, even though it is not currently below the threshold. Any of the data transmitted by the tank level monitor may be reported either on a mobile or desktop dashboard.

In one or more embodiments, the tank level monitor may be associated with a particular fuel tank (or multiple fuel tanks) through an activation process. In some cases, the first step of the activation process may involve contacting a portion of the tank level monitor with a magnet (or placing the magnet proximate to the tank level monitor). This may serve to "wake" the tank level monitor. That is, a tank level monitor may initially be in a "sleep mode" until it is activated using a magnet. The sleep mode may be a lower power mode of operation in which some functionality of the tank level monitor is not active. Maintaining the tank level monitor in this sleep mode is intended to conserve the battery life of the tank level monitor.

Once the tank level monitor is transitioned from the sleep mode to a normal mode of operation, the tank level monitor may be associated with the fuel tank by scanning a code on the fuel tank and/or tank level monitor. For example, the code may be a QR, however, any other type of scannable code may also be used as well. The QR codes may be scanned by a camera of a mobile device (for example, a smartphone) of a user that is performing the activation (or in any other suitable manner). In some cases, the particular fuel tank may also be determined through methods other than scanning a code, such as using GPS coordinates (for example, GPS coordinates of the mobile device or of the tank level monitor). For example, current GPS coordinates of a mobile device or tank level monitor may be compared to known coordinates for the fuel tank to determine the particular fuel tank that the user is attempting to associate with the tank level monitor.

Following this, the user may wait until the indicators on the tank level monitor indicate that the tank level monitor is connected to a network. For example, the tank level monitor may include multiple LEDs that may illuminate green when the tank level monitor is connected to the network. Once the tank level monitor is connected to the network, it may be physically installed on the fuel tank (though it may also be physically installed at any other time during this process as well). For example, the fuel monitor may be affixed to the fuel tank using the magnet(s) of the tank level monitor. The activation of the tank level monitor and the association of the tank level monitor with the fuel tank may then be indicated through the mobile device application, or otherwise through the software platform. An advantage of this activation process may be that immediately after the activation is complete, a user may be able to view data from the fuel tank. For example, the user may immediately be able to view fuel level data on the mobile device application, desktop or website application, or through any other system, device, etc. The user is not required to return to another location to complete the process and/or view data from the fuel tank.

In one or more embodiments, the activation process may also involve capturing certain data and providing it to the software platform. For example, the data may include an identification number associated with the tank level monitor, an identification number associated with the fuel tank, the name of the user performing the installation, the GPS location of the fuel tank and the tank level monitor, the time of day, or any other data. This data may be stored, and may be accessible through the mobile device application or otherwise through the software platform.

In one or more embodiments, the tank level monitor may include a predictive algorithm. The predictive algorithm may also be implemented in the mobile device application, a remote server, and/or any other part of the software platform as well. The predictive algorithm may allow for improved optimization of refuel truck routing and scheduling. For example, the predictive algorithm may be able to determine a remaining number of days until the fuel level of the fuel tank will fall below a threshold amount of fuel. This prediction may be based on factors such as a current fuel level of the fuel tank, a fuel consumption rate of the fuel tank, or any other factors described herein or otherwise. This information may be received by a tank level monitor from an existing monitor on a fuel tank (for example, an existing fuel gauge), or may be received directly from the fuel tank. In some cases, the predictive algorithm may also involve the use of artificial intelligence, machine learning, and/or the like. The predictive algorithm may be initially trained before being implemented in real-time such that the algorithm is better able to predict a remaining amount of time (e.g., days) until the fuel level crosses the threshold level. The predictive algorithm may also be further trained in real-time after a tank level monitor is deployed by using the real-time data captured by the tank level monitor.

In one or more embodiments, the predictive algorithm may also consider factors other than the fuel level data as well. For example, the predictive algorithm may be capable of predicting how fuel usage may alter over time. For example, if the fuel tank is being used in association with seasonal farming activity, current and future weather patterns may have an impact on how much fuel is being taken from a given fuel tank. As a second example, the predictive algorithm may consider factors relating to not only the fuel tanks and fuel usage, but also the refueling service as well. For example, depending on the availability of refueling trucks, price of fuel, etc., certain fuel tanks may be prioritized in the refueling schedule.

As a second example, certain fuel tanks may be scheduled for refueling even if their associated fuel levels have not crossed the threshold level. For example, if a refueling truck will be in a location including ten fuel tanks, and only five have crossed the threshold fuel level, the refueling truck may still refuel some or all of the other fuel tanks (or more than just the five fuel tanks) too in order to avoid having to reschedule the remaining fuel tanks for a later time (which may lead to scheduling inefficiencies). That is, the predictive algorithm may follow a rule indicating that if a group of fuel tanks have crossed their respective fuel thresholds, and neighboring fuel tanks have not necessarily crossed their particular refueling thresholds, but have crossed a second, higher threshold, then the neighboring fuel tanks may also be refueled during the same refueling trip. This may avoid a scenario where some of the fuel tanks are refilled, and then the truck is required to return within a short time span to refill the remaining neighboring fuel tanks. This rule may also take into consideration the fuel consumption rate of the neighboring tanks as well.

Additionally, the threshold fuel levels associated with fuel tanks may vary depending on the fuel tank, and also may be dynamic and adjustable rather than being static thresholds. For example, different fuel tanks in different locations may use different amounts of fuel at different rates. Given this, a fuel tank that uses fuel at a faster rate may be associated with a higher fuel level threshold to provide enough time to schedule a refilling of the fuel tank before all of the fuel is used. As another example, the rate of fuel usage may not necessarily be a constant. As the fuel usage decreases, the fuel level threshold may be decreased. For example, the automatic adjustments of the threshold may be performed based on a fuel consumption rate of a given fuel tank relative to neighboring fuel tanks or any other fuel tanks. As another example, the threshold may be optimized, for example using an objective function, or through any other suitable method.

In one or more embodiments, a user may be able to view information pertaining to different fuel tanks through the mobile application (and/or a desktop application, website application, and/or any other type of application). For example, the user may be able to view a list of tank level monitors that are currently installed on fuel tanks. The tank level monitors may be clustered based on certain factors, such as location. The user may also be able to view data associated with the fuel tanks, such as fuel levels for each of the fuel tanks, a number of days until the fuel levels cross a particular threshold, whether a refuel has been scheduled for a given tank, historical data relating to the fuel tanks and events that took place with respect to the fuel tanks, among other information. The user may also receive alerts through the mobile device application. For example, the mobile device application may provide an alert to the user when a fuel level of a fuel tank falls below a threshold level, such as a threshold associated with what might be considered a critically low level. The alerts may be user-configurable, or may be automatically generated. Additionally, the software platform may be capable of automatically scheduling refueling events based on the data provided by the tank level monitors.

Turning to the figures, FIG. 1 is a schematic illustration of example system 100 in accordance with one or more example embodiments of the disclosure. As shown in FIG. 1, the system 100 may include at least one or more mobile devices 110(1), . . . , 110(N), one or more fuel tanks 130 (which may be interchangeably referred to as "tanks" herein), which may be associated with one or more tank level monitoring device(s) 140, and one or more servers 160. In some cases, the one or more fuel tanks 130 may be positioned in different geographical locations separated by any amount of distance. However, some or all of the fuel tanks 130 may also be located in the same geographic region.

In one or more embodiments, communications between a mobile device 110, tank level monitoring (TLM) device 140, and/or server 160 may be performed via one or more networks 102, which may be wireless or wired networks. Examples of these networks may be described with respect to the example computing device of FIG. 21 (for instance, with reference to the network interface(s) 2108).

In one or more embodiments, the one or more mobile devices 110(1), . . . , 110(N) may include portable or non-portable devices, each having computing resources and communication resources that permit sending, receiving, or exchanging data and/or signaling wirelessly with an external electronic device (mobile or otherwise). For instance, the mobile devices can include a mobile telephone (such as a smartphone), a tablet computer, a wearable, a laptop computer, a gaming console, an electronic reader (e-reader), a consumer electronics device having wireless communication functionality, a home appliance having wireless communication functionality, a combination thereof, or similar.

In an illustrative configuration, a mobile device 110 may include at least a memory 114 and one or more processing units (or processors) 112. The processors 112 may be implemented as appropriate in hardware, software, firmware, or combinations thereof. Software or firmware implementations of the processors 112 may include computer-executable or machine-executable instructions written in any suitable programming language to perform the various functions described. The processors 112 and memory 114 may be described in additional detail with respect to the computing device of FIG. 21 (for example, processor(s) 2102, memory device(s) 2104, etc.

Turning to the contents of the memory 114 in more detail, the memory 114 may include an operating system 126 and one or more application programs or services for implementing the features disclosed herein, including a tank monitoring application 128 (which may be referred to here as the "mobile device application" or similar terminology). The tank monitoring application 128 may allow a user to perform certain functions using the mobile device 110. For example, the tank monitoring application 128 may allow a user to view data relating to fuel levels of any given fuel tank (as one non-limiting example). The tank monitoring application 128 may also allow a user to perform any other functions relating to any of the tank level monitoring devices 140. For example, the tank monitoring application 128 may be used to activate a tank level monitoring device 140 and associate the tank level monitoring device 140 with one or more fuel tanks 130. As a second example, tank monitoring application 128 may also allow the user to schedule refueling events for one or more fuel tanks 130 (or the refueling may be automatically scheduled). As a third example, the tank monitoring application 128 may be associated with the predictive algorithm, and may present recommendations for future refueling events to a user (or may automatically schedule the future refueling events). These are merely examples, and the tank monitoring application 128 may also allow a user to view any types of data relating to a tank level monitoring device 140 (or any other types of data) or perform any other functions as well (including any functions described herein). The tank monitoring application 128 may also be configured to present one or more different types of user interfaces (which may be exemplified in at least FIGS. 4A-4E).

Referring now to other illustrative components depicted in FIG. 1, the TLM device 140 may be configured to communicate with the mobile device 110 and/or server 160 and may be configured to perform any of the operations described herein. For example, the tank level monitoring device 140 may be associated with one or more fuel tanks 130, may capture information about the one or more fuel tanks 130 (for example a fuel level of each of the fuel tanks 130), and may transmit this information to the mobile device 110 and/or the server 160. The tank level monitoring device 140 may be communicatively coupled to existing monitoring devices (for example, a fuel gauge or other type of monitoring device) associated with the fuel tank, and may receive data from these existing monitoring devices. In some cases, however, the tank level monitoring device 140 may obtain data directly from the fuel tank 130 itself.

In one or more embodiments, the TLM device 140 may also include any number of different types of sensors 151 for capturing data relating to the TLM device 140 itself, the environment in which the TLM device 140 and the fuel tank 130 exist, the fuel tank 130, etc. For example, the TLM device 140 may include an accelerometer to determine when the TLM device 140 is in motion (which may indicate, in some instances, that the TLM device 140 has been stolen). The TLM device 140 may also include a temperature sensor, for example, to determine the ambient temperature of the environment. The TLM device 140 may also include any other number of sensors.

In one or more embodiments, the tank level monitoring device 140 may include some similar elements as the mobile device 110. That is, the tank level monitoring device 140 may include at least a memory 152 and one or more processing units (or processors) 142. The processors 142 may be implemented as appropriate in hardware, software, firmware, or combinations thereof. Software or firmware implementations of the processors 142 may include computer-executable or machine-executable instructions written in any suitable programming language to perform the various functions described.

Turning to the contents of the memory 152 in more detail, the memory 152 may include an operating system 154 and one or more application programs or services for implementing the features disclosed herein, including a tank monitoring module 156. In some instances, the tank monitoring module 156 may be configured to perform operations such as capturing data from a fuel tank 130 (as one non-limiting example). The tank level monitoring module 156 may also be configured to perform any other functions described herein that a tank level monitor may perform (or any other functions described herein or otherwise). For example, the tank level monitoring module 156 itself may implement the predictive algorithm instead of (or in addition to) the tank monitoring application 128 and/or the server 160.

In one or more embodiments, the server 160 (which may also be referred to herein interchangeably as a "TLM platform") may also have similar components as the mobile device 110 and/or the tank level monitoring device 140, including at least one or more processors 162, inputs devices 165, output devices 166, removable storage 168, non-removable storage 170, communication connections 176, and memory 171, the memory including one or more operating systems 172. The server 160 may be configured to perform any of the operations described herein. For example, the server 160 may host the software platform that may be used to implement the predictive algorithm (as one non-limiting example). However, the software platform may also perform operations on a tank level monitor 140 or a mobile device 110 as well. Additionally, it should be noted that while the tank level monitoring device 140, mobile device 110, and server 160 may be described as performing different types of example functions, some or all of these components in the system 100 may be capable of performing the same types of functions. As one non-limiting example, the predictive algorithm as described herein may be implemented on only the server 160, or may be implemented on the tank level monitor 140, or any other component and/or combination of different components.

In some embodiments, the server 160 may support the filtering of TLM devices 140 based on keywords and/or other filtering criteria. The server 160 may store, for a limited time, logs of active users, their access level, the last time they accessed the system, and TLM device message traffic for debugging purposes. The server 160 may support displaying graphs and tabular data for a specified date range for region and individual tank level. The server 160 may allow CSV export of alert and log data by filtering population and date range (from and to). The server 160 may log changes made by the user to the configuration of a specific tank or other entity.

The server 160 may display open alerts reported by a TLM device 140 and acknowledge receipt of alert with recorded person and time stamp which will change alert status from open to closed. The server 160 may display alert status as open or closed. The server 160 may display closed alert history associated with each TLM device 140. The server 160 may also display a visual indicator when devices have default status normal, (for example, if no open or closed alerts are associated with the device). Examples of visual indicators are presented in FIGS. 4A-4E).

The server 160 may enable users to view all alerts with the ability to filter by population type and drill down to device level. The server 160 may Flag abnormal tank usage (Future State). Establish what is "normal" behavior for a given tank (or type of tank), so that abnormal behavior could trigger an alert. For example, if the level of a tank begins dropping drastically and looks on pace to be empty much sooner than expected.

The server 160 may enable users to configure the first report time for devices within a select, one-hour timeframe (e.g. first report between 1-2 am or first report between 2-3 am) and set the report time of individual and/or populations of devices (Future State). This is to ensure that users have up-to-date information when they start their day. The server 160 may generate custom reports (Future State). Users would have the ability to create reports tailored to groups of recipients and include a PDF option. The reports would only include the tanks assigned to that user. Set up emails at a certain time with certain filters to certain people. The server 160 may generate reports for problematic devices (Future State). Ability to send a weekly email report of problematic devices to be sent to specific user groups. This will be necessary in production, i.e. a means of determining and providing alerts for problem devices (whether because of low battery, defect, lack of coverage, etc.).

Figure 21:
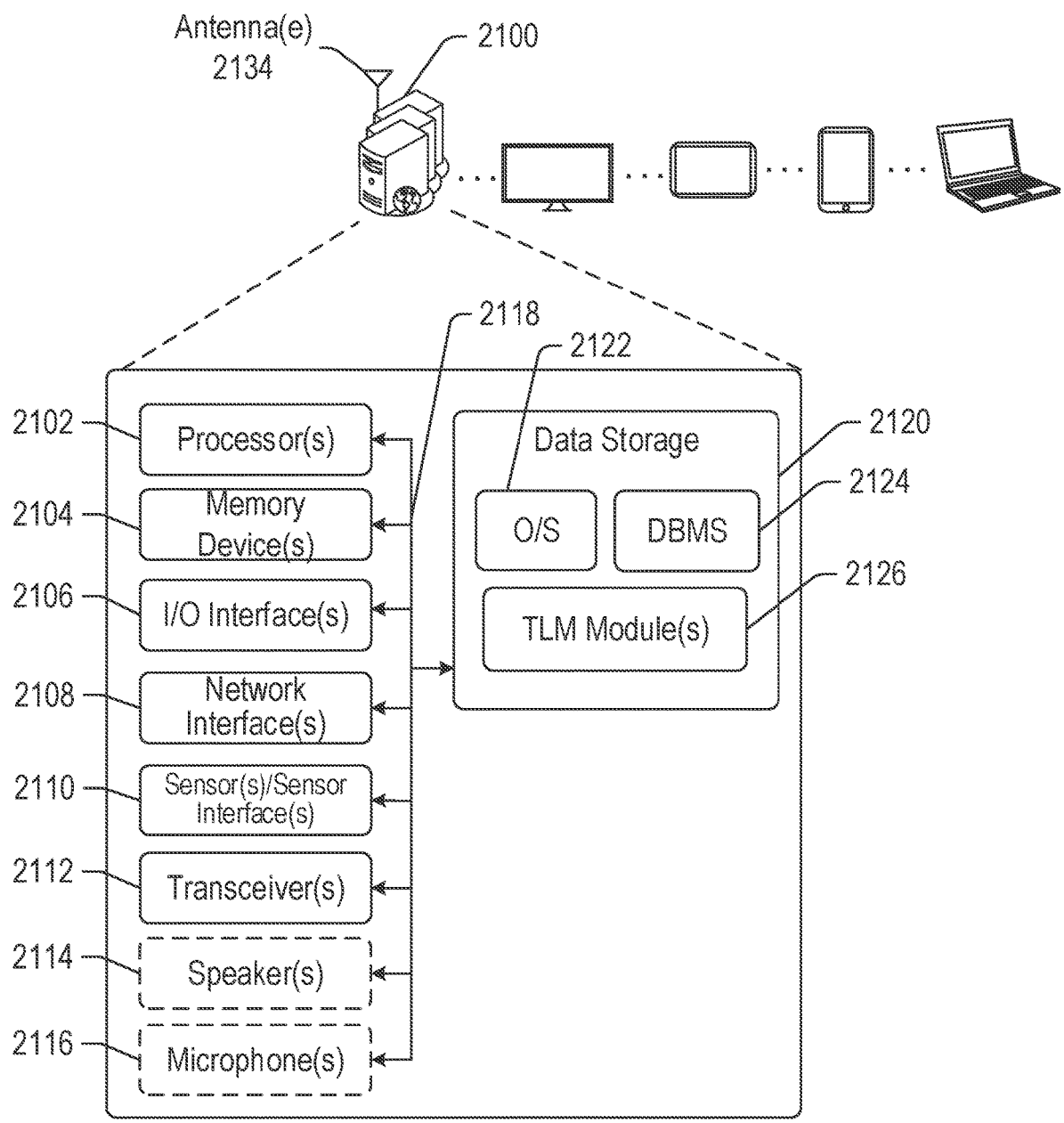
FIG. 21 depicts a schematic illustration of an example computing device, in accordance with one or more example embodiments of the disclosure.

Any of the elements of the one or more mobile devices 110(1), ... , 110(N), one or more fuel tanks 130, one or more tank level monitoring device(s) 140, and/or one or more servers 160 (for example, processors, memory, input and/or output devices, storage, communications devices, operating system, etc.) may be described in additional detail with respect to FIG. 21 as well.

Figure 2:
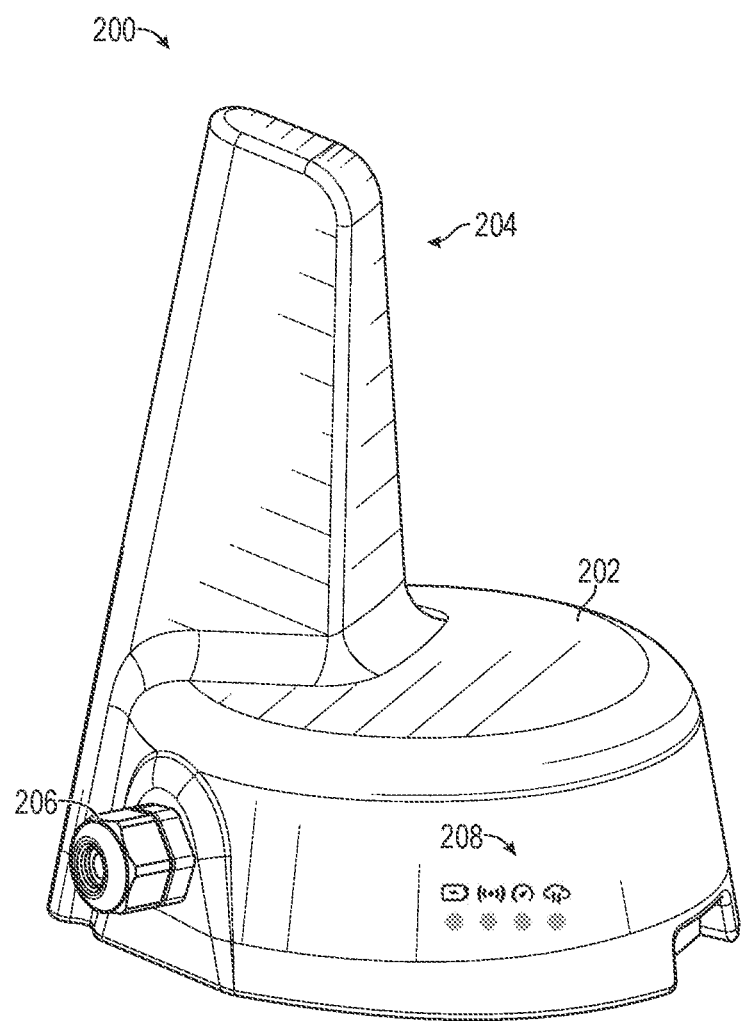
FIG. 2 depicts a perspective view of an example tank level monitoring device, in accordance with one or more example embodiments of the disclosure.

FIG. 2 depicts a perspective view of an example tank level monitoring (TLM) device 200, in accordance with one or more example embodiments of the disclosure.

In one or more embodiments, the TLM device 200 may include an outer housing 202. The outer housing 202 may be comprised of any number of different types of materials (for example, plastic, etc.) and may encompass any internal components of the TLM device 200. For example, the outer housing 202 may protect any electronics included within the TLM device 200 (for example, sensors, processors, any elements of the TLM device 140 described with respect to FIG. 1, the computing device 2100 described with respect to FIG. 21, and/or any other types of electrics that may be included within the TLM device 200) from the external conditions, such as weather conditions.

The TLM device 200 may also include one or more antennas. For example, the figure shows the TLM device 200 as including an antenna 204. The antenna 204, for example, may be used by the TLM device 200 to perform wireless communications with a remote system (such as remote server 160, which may be the same as any "TLM platform" described herein, as well as any other remote system). In some embodiments, the wireless communications may be performed over a cellular network, such as a narrowband internet of things (NB-IoT) network, however, the wireless communication may also be performed over any other type of wireless network as well. In some instances, these communications may also be performed over a wired network as well.

These wireless communications may involve the TLM device 200 transmitting various types of data to the remote server. For example, the TLM device 200 may transmit any data captured from the tank, such as fuel levels and/or any other types of data. The TLM device 200 may also transmit other data that is captured, such as a current date/time at which any data is captured, an ambient temperature of the environment surrounding the TLM device 200, accelerometer data indicative of whether the TLM device 200 has been removed from a tank, etc. The TLM device may 200 may also transmit other types of information, such as an indication of an alert associated with the TLM device 200 or the tank itself. In some cases, the alerts may be generated by the remote server based on the data that is received from the TLM device 200 rather than the TLM device 200 itself generating the alerts. In some cases, the communications may also be two-way communications such that the remote system may transmit data, commands, and other messages to the TLM device 200 as well.

The TLM device 200 may also include one or more connectors 206. For example, the figure shows the connector 206, which may include a waterproof locking nut]. However, any other number and/or different types of connectors may also be used as well. The connector 206 may allow a cable to be connected to the TLM device 200 and a tank, which allows for data sharing between the TLM device 200 and the tank. However, this data sharing may be through wireless communications as well, as is described in additional detail with respect to FIG. 3.

As is described in additional detail below, the TLM device 200 may also be configured to wake up periodically. For example, the TLM device 200 (and/or any other TLM device described herein) may primarily operate in a low-power "sleep" mode. In one or more embodiments, the "sleep" mode my involve temporarily disabling various components of the TLM device 200 (for example, any processors, transceivers, and/or any other components). The TLM device 200 may be placed in this sleep mode to improve the longevity of the battery used to power the TLM device 200. However, the TLM device 200 may be transitioned into a higher power mode (for example, "wake" from the sleep mode) at various intervals to perform functions such as capturing data from the tank, transmitting data to the TLM platform, generating alerts, and/or performing any other functions. As described herein, the TLM device 200 may also be transitioned to the higher power mode based on activation using a magnet that is detected by a Hall Effect sensor. The TLM device 200 may also "wake" based on any other types of triggers.

In some embodiments, the TLM device 200 may be triggered to transition from a sleep mode to a higher power mode by contacting the TLM device 200 with a magnet (or positioning a magnet in proximity of the TLM device 200). This may serve wake the TLM device 200. That is, a tank level monitor may initially be in a "sleep mode" until it is activated using the magnet. For example, the TLM device 200 may include one or more Hall Effect sensors that may detect the presence of the magnet. The TLM device 200 may trigger a wake-up procedure based on a length of time that the magnet is detected by the Hall Effect sensor. However, the TLM device 200 may be trigger to transition from the sleep mode to the higher power mode based on any other triggers (for example, a press of a button, based on a time interval, etc.). The TLM device 302 may include the ability to manually force a check-in to the network (e.g. by double tapping the device).

In one or more embodiments, TLM device 200 may include any number of LEDs 208 (and/or any other types of illuminating elements) that may be used to indicate any number of different types of information. For example, the LEDs 208 may be used to provide indications of information relating to the operation of the TLM device 200, such as battery level, network connectivity status, current power mode, etc. In some embodiments, to maintain battery, the TLM device 200 may not illuminate the LEDs 208 by default. The TLM device 200 may illuminate indicators for 10 seconds (or any other amount of time after a tap using magnet, for example) is detected. These 10 seconds (or any other amount of time may be referred to as the illumination period. However, the LEDs 208 may also remain illuminated for any other amount of time as well, even without requiring a tap).

A first example of LEDs 208 may include battery level indicator(s). When the remaining battery of the TLM device 200 is less than or equal to a first threshold (for example, 5% or any other percentage), the TLM device 200 may illuminate a first LED (during the illumination period). When remaining battery is greater than the first threshold and less than or equal to a second threshold (for example, 33% or any other percentage), the TLM device 200 may illuminate a second LED. When the remaining battery is greater than the second threshold 33% and less than or equal to a third threshold (for example, 66% or any other value), the TLM device 200 may illuminate a third LED. When remaining battery is greater than the third threshold, the TLM device 200 device may illuminate a fourth LED. This is merely an example of a manner in which different LEDs may be used to indicate different battery levels and is not intended to be limiting.

Another example of an LED 208 may include connectivity indicator(s). For example, the TLM device 200 may illuminate a network connectivity indicator when network connectivity is available (for example, when a NB-IoT network, or any other network, is available). The TLM device 200 may also include a separate LED that may illuminate to indicate a connection with a tank. For example, the TLM device 200 may illuminate a gauge connector indicator when the tank gauge is detected. TLM device 200 may support a red Error indicator. Any of the LEDs 208 may also be configured to illuminate different colors, flash at particular frequencies, and/or function in any other manner to provide additional information, such as error states. This is merely an example of a manner in which different LEDs may be used to indicate network connectivity and is not intended to be limiting.

In one or more embodiments, the TLM device 200 may also be capable of providing information to a user in any other manner as well. For example, the TLM device 200 may include one or more speakers and may provide audible information to a user. For example, the TLM device 200 may audibly provide a "battery low" alert to a user. As another example, the TLM device 200 may provide tactile feedback, such as vibrations. The TLM device 200 may also be configured to provide information to a user in any other manner as well.

The TLM device 200 may maintain and be able to report a reason for a device reboot. For example, a firmware download, a power loss, an unexpected reboot, etc. The TLM device 200 may also maintain the number of minutes the TLM device 200 has been operational since the last reboot. The TLM device 200 may also maintain network quality metrics, such as reference signal received quality (RSRQ), reference signal received power (RSRP), received signal strength indicator (RSSI), band information, ECL, transmission power, cell identifier, and other data. The TLM device 200 may also maintain counters for individual message retry attempts. The TLM device 200 may also support reporting operation metrics to the TLM platform as defined in the ICD One of ordinary skill in the art would understand that the configuration of the TLM device 200 as shown in the figure is merely illustrative and any other type of configuration may also be used as well. For example, the shape and/or size of the outer housing 202 may vary, the antenna 204 may be positioned in a different location, may be a different size, and/or there may be multiple antennae included. The connector 206 may be a different type of connection, may be positioned in a different location, and/or any other number of connectors of different types may also be provided at any other position. These are merely a few illustrative examples of alternative configurations for the TLM device 200 and are not intended to be limiting.

Figure 3:
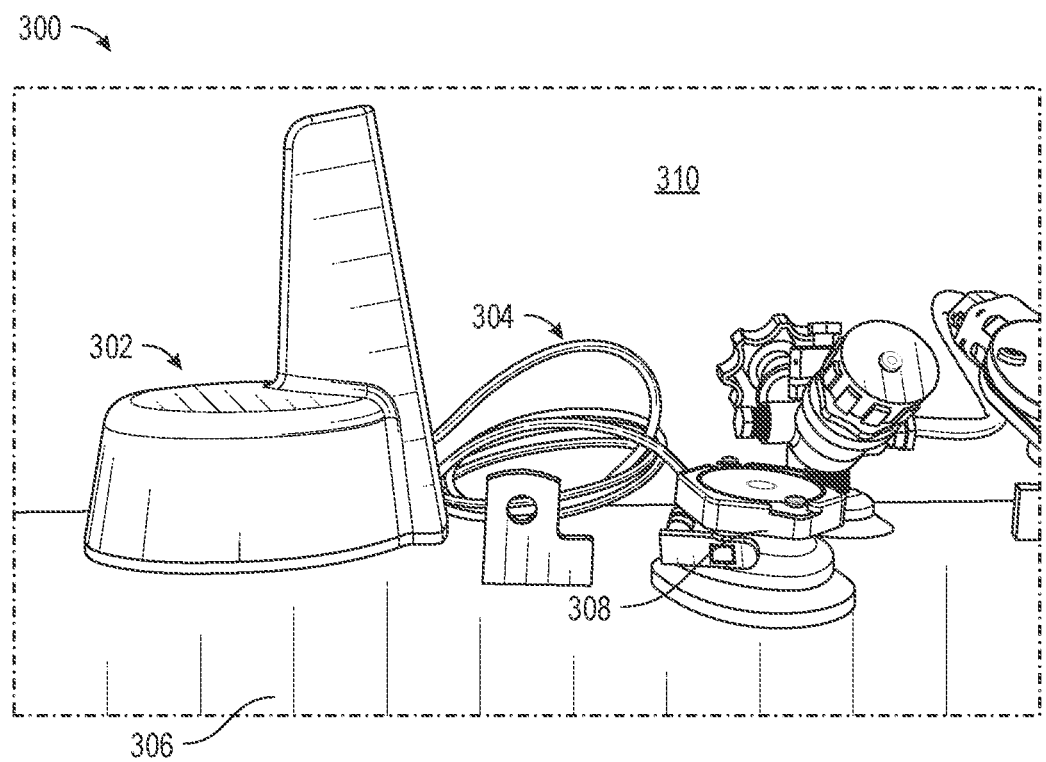
FIG. 3 depicts an example of a tank level monitoring device installed on a tank, in accordance with one or more example embodiments of the disclosure.

FIG. 3 depicts an example of a tank level monitoring (TLM) device 302 installed on a tank 306, in accordance with one or more example embodiments of the disclosure.

Particularly, the figure shows an electrical connection between the TLM device 302 (which may be the same as TLM device 200 and/or any other TLM device described herein) and a gauge 308 installed on the tank 306. In one or more embodiments, the TLM device 302 may specifically be configured to connect to a Rochester Ready gauge associated with the fuel tank. However, while reference may be made to a Rochester Ready gauge, it should be noted that any the TLM device 302 may be connected to any other type of gauge (or component of the tank that is not a gauge) to obtain data from the tank. As one additional non-limiting example, the TLM device 302 may be connected to other types of sensors that may capture additional types of data from the tank.

This connection may be made between the connector (not shown in the figure, but may be the same as connector 206) and the gauge 308 using a cable 304. For example, the cable may be a fiber optics cable, a coaxial cable, and/or any other type of cable. The cable 304 between the TLM device 302 and the gauge 308 may be detachable. In some cases, the cable 304 between the TLM device 302 and the gauge 308 may use a straight gauge connection adaptor. The connection may also be made through wireless communication rather than requiring the use of the cable 304. For example, the TLM device 302 and the tank may both include transceivers that may be used to transmit wireless signals between the TLM device 302 and the tank 306. The data transfer between the TLM device 302 and the gauge 308 (and/or any other component of the tank from which the TLM device 302 receives data) may also be performed in any other manner as well. As used herein, the term "communicatively coupled" may refer to any type of wired or wireless connection.

In one or more embodiments, the TLM device 302 may be removeably disposed at any location on the surface of the tank 306. That is, the TLM device 302 may be configured to be disposed on the tank 306, but also removed from the tank 306 at any given time. For example, a TLM device 302 may be removed from a tank 306 to perform maintenance on the TLM device 302, if it is no longer desired for the particular TLM device 302 to be used to capture data from the tank 306 (such as when the tank is no longer in use or a user desires for the TLM device 302 to be used to capture data from a different tank rather than the original tank 306 on which the TLM device 302 was installed), and/or for any other purpose.

In one or more embodiments, the TLM device 302 may be disposed on a hood of the tank 306. However, the TLM device 302 may also be disposed on any other portion of the tank 306. The TLM device 302 may also be physically configured to account for any curvature of the tank 306 such that the TLM device 302 may be able to mount flush with the surface of the tank. Thus, there may be a certain degree of curvature in the TLM device 302 itself to account for the curvature of the tank 306. The TLM device 302 may be removably disposed on the tank 306 in any number of different ways. For example, the TLM device 302 may be disposed on the tank 306 using a hook-and-fastener connection between the TLM device 302 and the tank 306. As another example, the TLM device 302 may include one or more magnets on a bottom portion of the TLM device 302 that may allow the TLM device 302 to be removably disposed on a metal surface of the tank 306. The TLM device 302 may also be removably disposed on the tank 306 in any other way beyond these non-limiting examples. In some cases, the TLM device 302 may not necessarily be disposed on the tank itself, but rather may be provided proximate to the tank.

FIGS. 4A-4E depict example user interfaces for a mobile device application (for example, the tank monitoring application 128 and/or any other mobile device application described herein), in accordance with one or more example embodiments of the disclosure. The mobile device application may allow a user to access a user account and view information about any TLM devices and/or tanks associated with the user account. For example, the mobile device application may also user to view data captured by any of the TLM devices, such as fuel levels of various tanks. The mobile device application may also allow the user to configure TLM device and/or tank alert settings. The mobile device application may also allow the user to schedule refueling events (and/or may simply provide an indication to the user when the refueling events are automatically scheduled). The mobile device application may also allow the user to remotely control operation of any of the TLM devices. The mobile device application may also allow the user to perform any other types of functionality with respect to the TLM devices and/or the tanks.

Figure 4A:
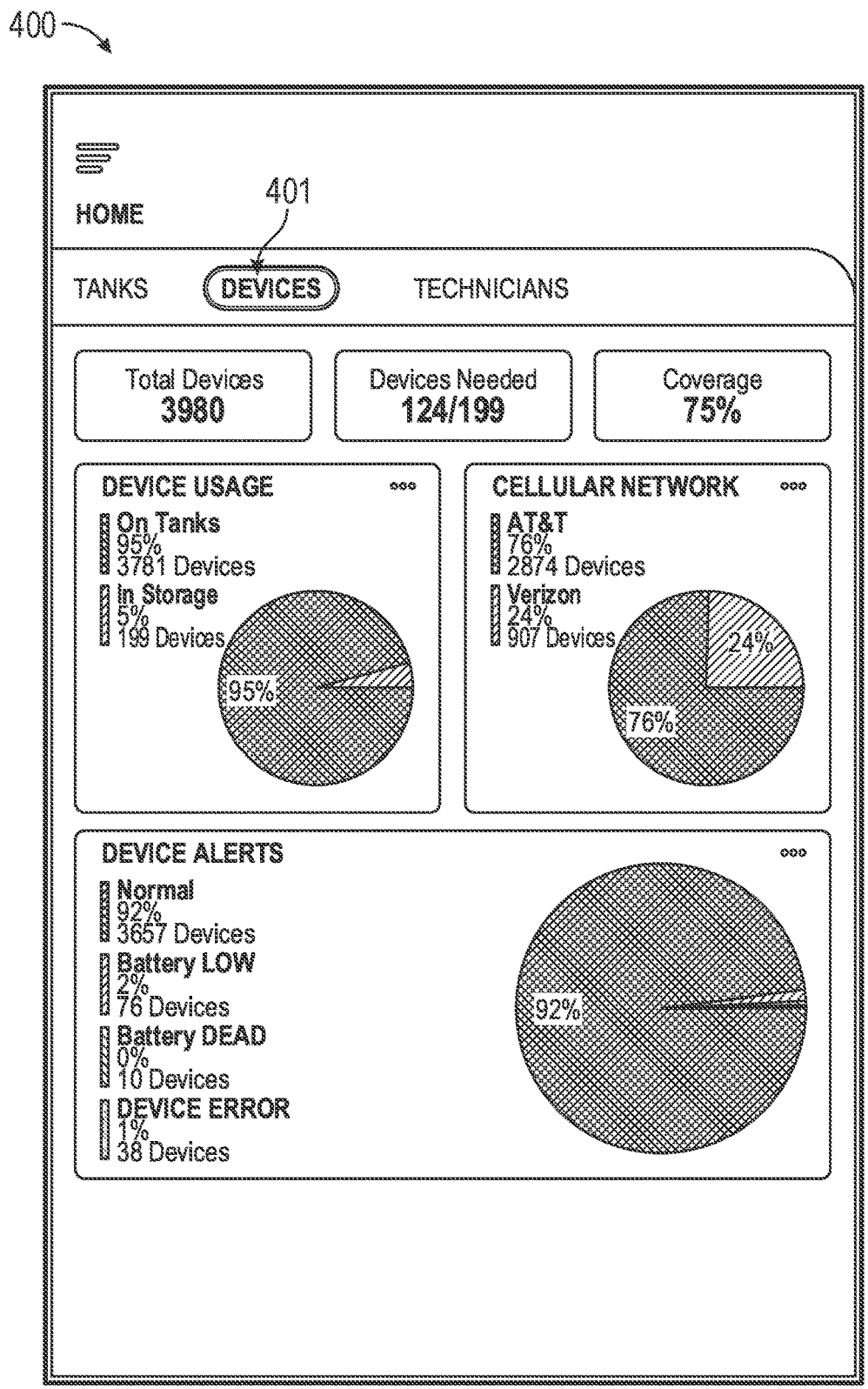

Beginning with FIG. 4A, a first example user interface 400 associated with the mobile device application is shown. Particularly, the user interface 400 may be associated with a devices tab 401. For example, a user may select the devices tab 401 and the user interface 400 may be presented to the user through the mobile device application. The user interface 400 may display to the user information about particular TLM devices (for example, TLM devices that are associated with a user account accessed through the mobile device application). For example, the user interface 400 may display at least a total number of TLM devices associated with the account, a number of devices that are required (for example, a number of devices needed to obtain total coverage for all fuel tanks associated with a user), and/or a coverage percentage (for example, a percentage of tanks associated with the user account that include TLM devices capturing data from those tanks)

The user interface 400 may also display device usage metrics. For example, the usage metrics may indicate a first percentage of total TLM devices that are currently installed on tanks and capturing data from those tanks. The usage metrics may also indicate a second percentage of the total TLM devices that are not installed on any tanks (for example, any TLM devices that are held in storage or otherwise not in use). The usage metrics may also include more granular types of information, such as a number of TLM devices that are in an error state, the number of TLM devices in use in different geographic regions, etc.

The user interface 400 may also display cellular network usage metrics. For example, the cellular network usage metrics may provide an indication of the different cellular providers that are used in association with any TLM devices (for example, to perform wireless transmission of data between the TLM devices and the TLM platform). As shown in the figure, the user interface 400 shows two cellular providers and displays the percentage of TLM devices that are associated with each cellular provider. The cellular network usage metrics may also be more granular. For example the cellular network usage metrics may include information about which cellular providers are used in particular geographical regions.

The user interface 400 may also display any device alerts that are provided by the TLM devices (and/or any TLM device alerts that are generated by the mobile device application and/or the TLM platform and provided to the mobile device application based on data captured by the TLM device). In some cases, a listing of different types of TLM device alerts may be presented and a percentage of devices that have provided these alerts may be indicated. For example, the figure shows that 92% of devices have not provided any alerts and are operating normally. 2% of devices have provided a "battery low" alert indicating that the battery of the TLM device may need to be changed. Less than 1% of devices have provided a "battery dead" alert meaning that the TLM device may not be able to operate until the battery is replaced. 1% of devices have provided a "device error" alert. There may be a number of other different types of alerts that may also be presented that are not shown in the figure. However, some of the types of alerts may not necessarily be presented in the user interface 400 until at least one TLM device has provided the alert. This may reduce the amount of extraneous information that is presented to the user through the user interface 400. However, in some cases it may be desirable for the user to be able to view an indication that there are no devices providing a particular type of alert as well. These options may also be configured within settings associated with the mobile device application.

A user may also be able to select individual alert categories to view more granular information (or the granular information may simply be presented in the user interface 400 without requiring the selection by the user). For example, the user may view information about which specific TLM device are associated with a particular type of alert, GPS locations of the TLM devices (which may also be presented on a map that is displayed through the mobile device application), and/or any other types of more specific information at the device level.

The type of information presented in the user interface 400 is merely exemplary and not intended to be limiting. Any other information relating to any of the TLM devices and their operation may also be displayed as well. Additionally, the type of information that is displayed in this user interface 400 may be configurable by a user such that they are presented with information that is of the most interest to the user. For example, the user may indicate in settings associated with the application that they would rather view a map including GPS locations of the TLM devices than the types of cellular networks that are being used. Based on such indications by the user, the specific types of information that is presented to the user may be modified by the application.

This may also be applicable to any of the other user interfaces of FIGS. 4B-4E described below. That is, any of the user interfaces described herein are merely exemplary and are not intended to be limiting in any way. For example, any other types of information about any of the TLM devices, tanks, and/or any other information may be displayed to a user through the application in any other suitable format.

Additionally, any of the information presented in any of the user interfaces of the mobile device application may be presented in any suitable form, such as text-based information, visual information (such as the pie charts shown in the figure), etc. The form in which the different types of information is shown as being presented in the example user interfaces in the figures is merely exemplary and not intended to be limiting.

Furthermore, it should be noted that while the user interfaces of FIGS. 4A-4E are described as user interfaces for a "mobile device application," similar user interfaces may also be displayed to a user through any other type of application, such as an application accessible through a website, desktop or laptop computer, etc. That is, the user interfaces are not intended to be limited to only a mobile device application.

FIG. 4B shows a second example user interface 410 associated with the mobile device application. Particularly, the user interface 410 may be associated with a tanks tab 411. For example, a user may select the tanks tab 411 and the user interface 410 may be presented to the user through the mobile device application upon selection. The user interface 410 may display to the user information about any of the tanks that are associated with the user account. For example, the user interface 410 displays a total number of tanks, a total number of technicians, a total volume of fuel that was sold in a given period of time, and/or any other relevant information.

The user interface 410 may also display a number of tank fuel refills that were completed within a given period of time. As illustrated in the figure, the number of refills may be an aggregated number for the total number of tanks associated with the user account. This data may be presented as raw data (for example, the refill numbers may be presented through the user interface 410). The data may also be presented in a visual format, such as the line graphs shown in the figure. The data may also be categorized as well. For example, the figure shows individual refill data for propane tanks, diesel tanks, and for all tanks. However, the data may be categorized in any other manner as well (for example, by geographical region, etc.).

The user interface 410 may also display information about the total number volume of fuel from the tanks that was sold. Similar to the refill data, the volume of fuel sold data may be presented as raw data and/or in a visual form (such as the line graphs shown in the figure). Also similar to the refill data, the volume of fuel sold data may be categorized. For example, the figure shows individual refill data for propane tanks, diesel tanks, and for all tanks. However, the data may be categorized in any other manner as well (for example, by geographical region, etc.).

The user interface 410 may also display fuel type information. For example, the user interface 410 may display information about the percentage of different types of fuel that are used in any of the tanks.

The user interface 410 may also display any alerts generated in association with any of the tanks. For example, as shown in the figure, there are a number of different types of alerts may be presented based on a predicted number of days until the fuel level of the tank is empty or may cross below a threshold fuel level. For example, a first alert may be provided if the predicted amount of times is 1-5 days, a second alert may be provided if the amount of time is 6-10 days, a third alert may be provided if the amount of time is 11-15 days, etc. These may also be different types of alerts to indicate the relative urgency of the predicted amount of time remaining. The alerts may also alert a user of any other types of information as well.

Additionally, a user may be able to view information about individual tanks as shown in the third user interface 415 illustrated in FIG. 4C. For example, the user interface 415 shows information associated with a particular tank, "Tank 2351." More specifically, the user interface 415 shows the total number of fuel refills that have been performed for the tank, a total number of refills performed within a given period of time, a number of gallons of fuel that have been used from the tank, and/or a total number of gallons of fuel that have been used from the tank over a given period of time. The user interface 415 may also display information such as a data of a last refill, an amount of time since the last refill, a current fuel level of the tank, and/or an estimated amount of time until the tank is empty or below a threshold amount of fuel remaining. The user interface 415 may also display information, such as the fuel usage over time and the average amount of time between refills.

Figure 4D:
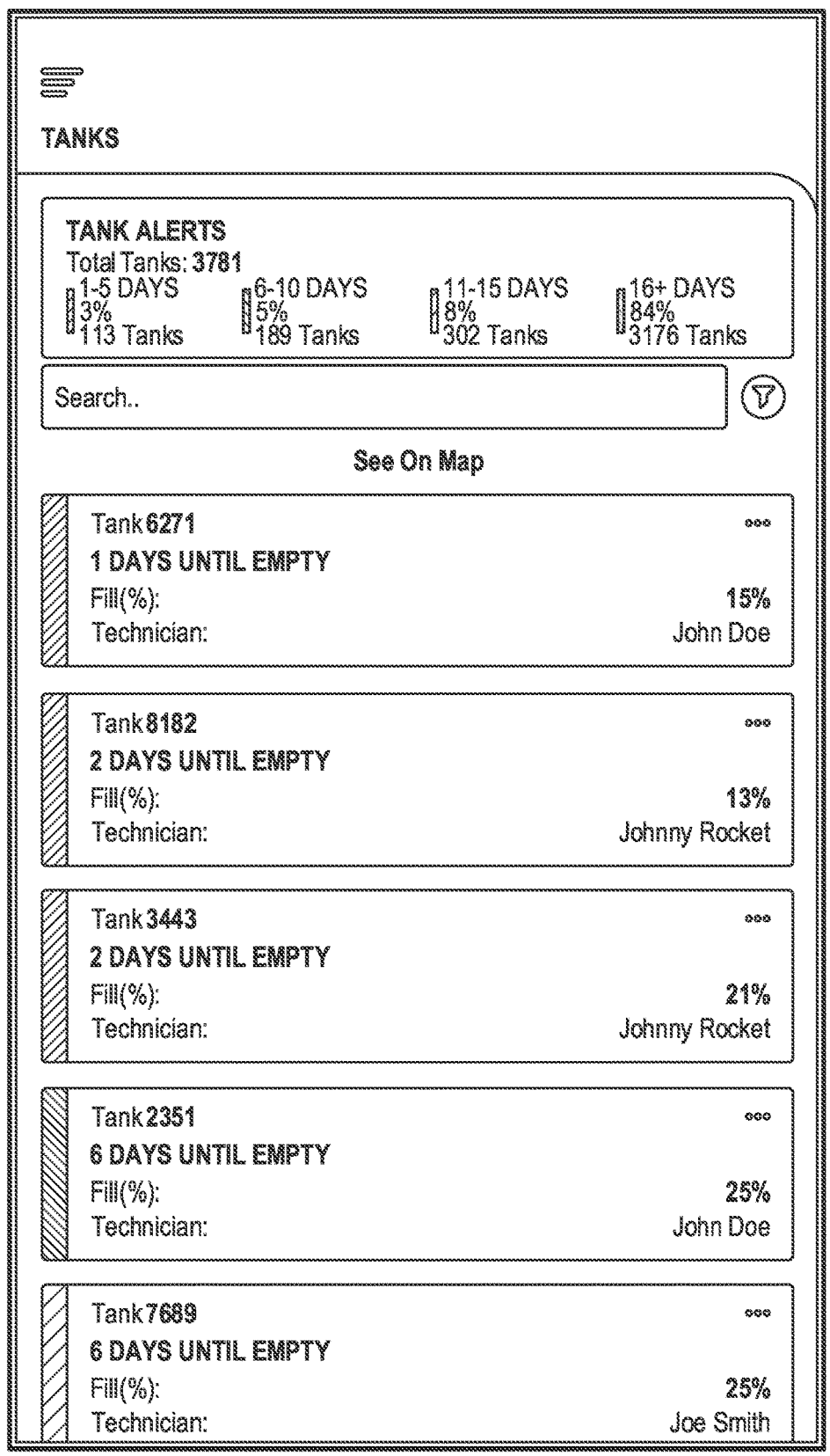

Furthermore, a user may be able to view more specific information about tank alerts as shown in the third user interface 420 illustrated in FIG. 4D. Particularly, the user interface 420 shows aggregated tank alert information, as well as alerts provided by individual tanks. The alerts may include indications that fuel levels for a particular tank are such that the tank may need to be refilled within a given number amount of time. For example, the figure shows an alert for "Tank 6271" that indicates that the remaining fuel in the tank is 15% and that there is an estimated one day remaining until the tank will be empty.

Figure 4E:
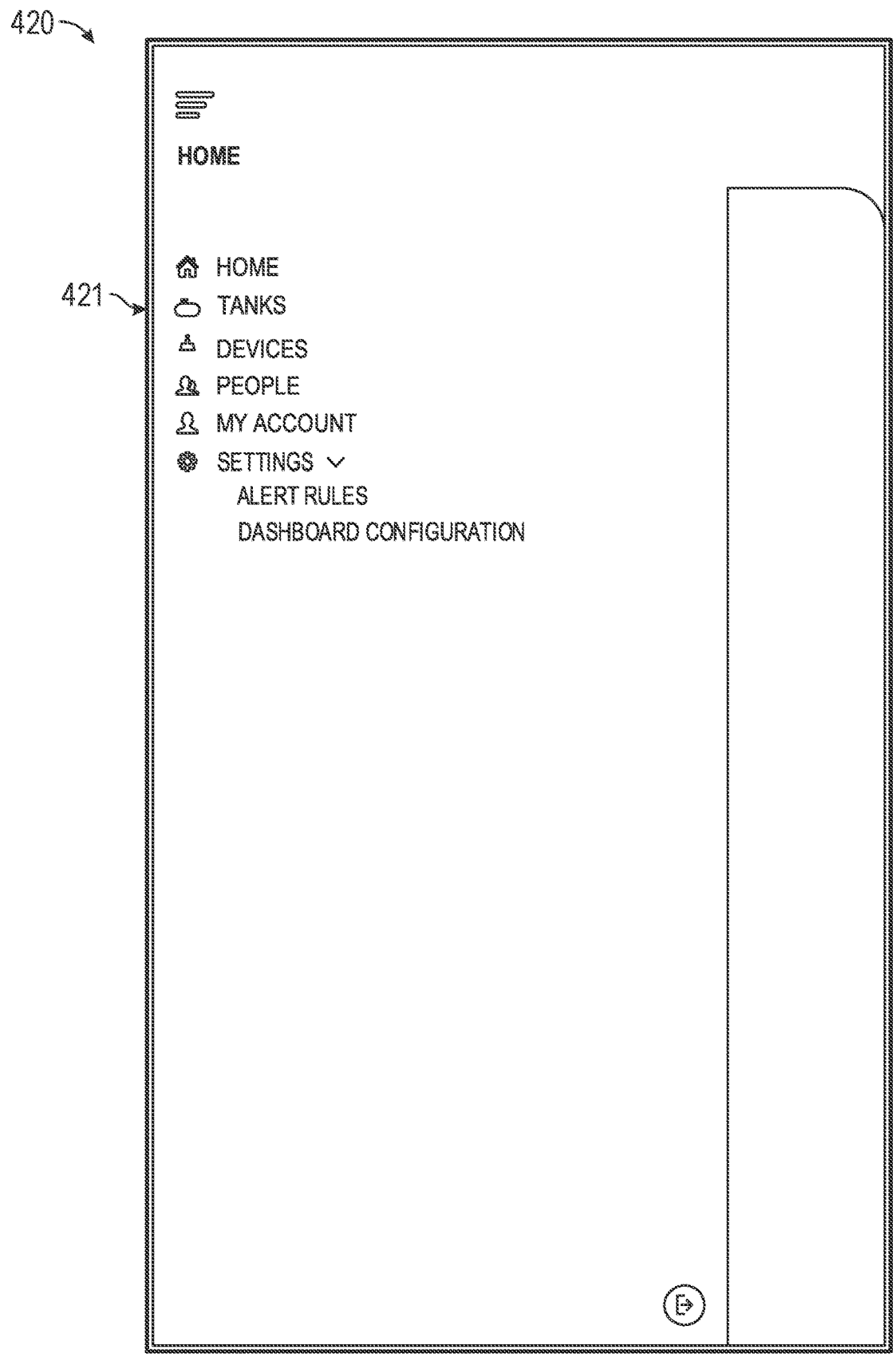

FIG. 4E shows a fifth example user interface 430 associated with the mobile device application. Particularly, the user interface 430 may present an example application "home page." The user interface 430 may include one or more different selectable elements 431. Upon selection of one of the selectable elements 431, a different user interface may be presented to the user based on which selectable element 431 is selected. For example, a user may select the "devices" element and the user interface 400 may be presented through the mobile device application. Similarly, the user may be able to select the "tanks" element and the user interface 410 may be presented through the mobile device application.

In one or more embodiments, the user interface 430 may also include a settings element. Upon selection, a settings user interface (not shown in the figure) may be presented to the user. The settings user interface may provide the user with various settings associated with the application and/or the operation of any TLM devices. For example, the user may be able to modify the settings to adjust the types of information that are presented to the user through any of the user interfaces.

As another example, the user may be able to establish alert rules associated with any of the TLM devices. The user may be able to add and/or remove rules that may be used by a TLM device to determine when an alert should be generated for the TLM device itself and/or a tank. For example, the user may indicate through the settings portion of the application that alerts should be provided by any TLM devices when their associated tanks are below a 20% fuel level. As a second example, the user may indicate that alerts should be provided when an estimated remaining number of days until the tank is empty is less than or equal to five days. The alerts may also be made based on more complex conditions being satisfied, such as the tank being located in a particular geographic region and the fuel level being below a threshold percentage volume.

Figure 5A:
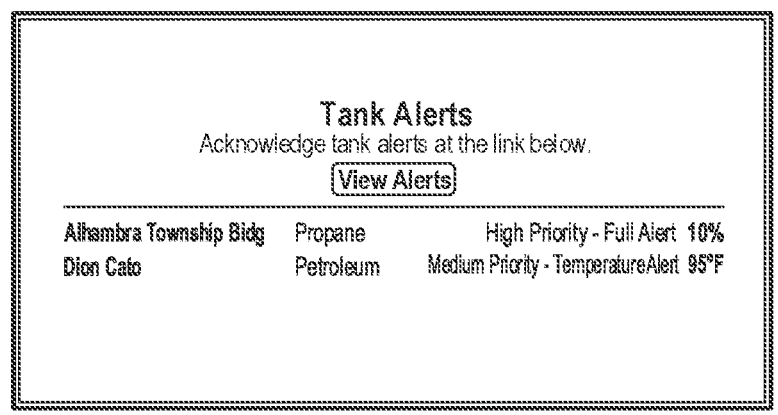
FIGS. 5A-5B depict example alerts, in accordance with one or more example embodiments of the disclosure.
Figure 5B:

FIGS. 5A-5B depict example alerts, in accordance with one or more example embodiments of the disclosure. That is, while the mobile device application user interfaces shown in FIGS. 4A-4E may be configured to provide alert information to a user, there may also be any other number of ways in which alert(s) may be provided to a user. For example, a list of alerts may be presented to a user through a website 500, as shown in FIG. 5A. As another example, a text message alert 520 may be provided to the user, as shown in FIG. 5B. In some cases, these other types of alerts may also be configured within the mobile device application. For example, the user may indicate that they want the alerts to be presented through the mobile device application itself, but may also indicate that they desire to receive text alerts in addition to the application alerts (or alternatively to the application alerts). Alerts may also be provided to a user through any other methods and/or may be configured through any other system and or device as well.

Figure 6:
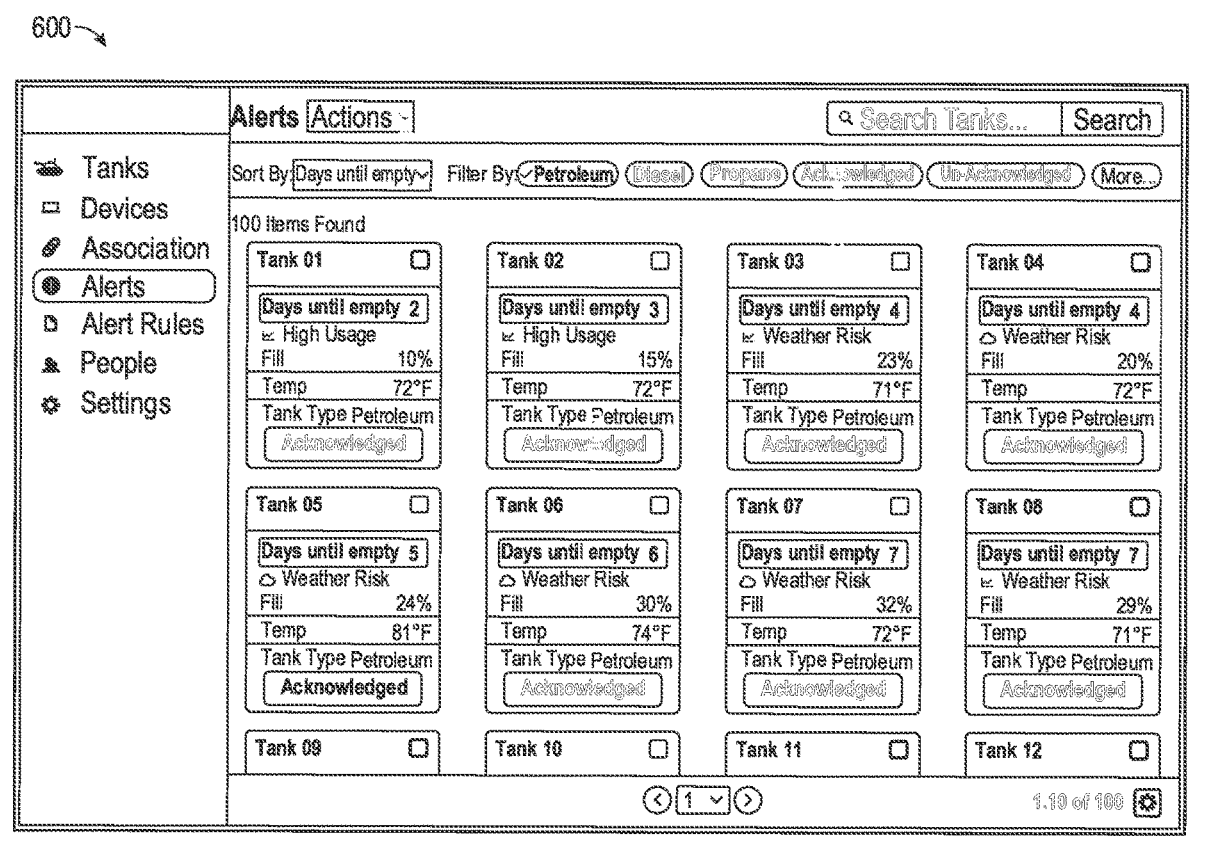

FIG. 6 depicts an example user interface 600 associated with a predictive algorithm, in accordance with one or more example embodiments of the disclosure. The user interface 600 may be displayed, for example, through the mobile device application, a website, and/or any other system and/or device.

The user interface 600 illustrates particular types of predictions that may be determined by a predictive algorithm and presented to a user. For example, the predictive algorithm may provide predictive information about how the fuel levels of a given fuel tank may change in the future. For example, the tank level monitor may be capable of estimating a remaining number of days until a given fuel tank is empty or has less than a threshold amount of fuel. The predictive algorithm may also consider other factors, and may allow for the optimization of refueling scheduling for any of the fuel tanks.

The user interface 600 shows that predictive data may be shown for each individual tank associated with the user account. For example, the figure shows a first tank ("Tank 01") associated with a prediction that two days remain until the fuel level in the tank may be empty. The user interface 600 may also present other relevant information associated with that tank, such as a current fuel level, an ambient temperature (and/or a temperature of the tank), a type of fuel included in the tank, and/or any other relevant information. This information may also be presented in the aggregate over one or more groups of tanks.

The user interface 600 also shows that the order in which information about the individual tanks is displayed may be automatically sorted. For example, the figure shows a "days until empty" sorting criteria as being selected. This may display information about the tanks in order starting from a tank associated with a lowest number of days until fuel level in the tank may be empty to a tank associated with a highest number of days until fuel level in the tank may be empty. The order of the information may also be sorted in any other manner as well.

Additionally, the user interface 600 also shows that the information that is presented may be filtered based on certain selectable criteria. For example, the user interface 600 shows that only the petroleum fuel filter was selected, so only tanks including petroleum fuel may be displayed to the user. However, any other types of filter criteria and/or combination of filter criteria may also be used as well.

The user interface 600 shown in the figure is merely exemplary and illustrates one presentation of predictive data produced by the predictive algorithm.

Figure 7:
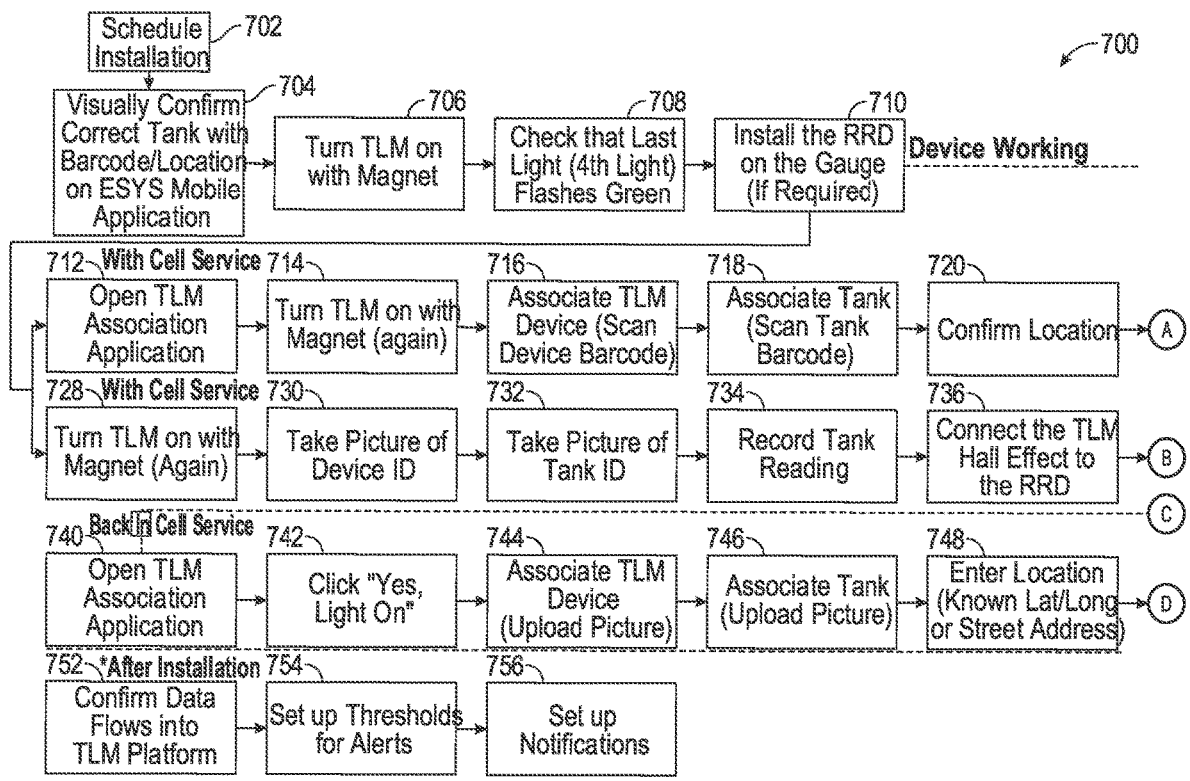
FIG. 7 depicts an example flow diagram for a tank level monitoring device installation, in accordance with one or more example embodiments of the disclosure.
Figure 7:
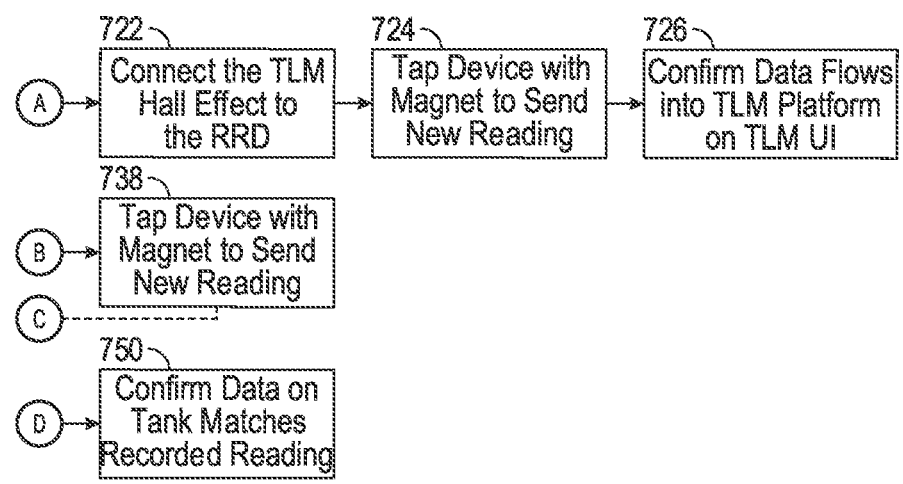

FIG. 7 depicts an example flow diagram 700 for a tank level monitoring device installation, in accordance with one or more example embodiments of the disclosure.

Operation 702 may include scheduling an installation of a TLM on a fuel tank. In some cases, the installation may be scheduled by a user. For example, a user may schedule an installation through the mobile device application, a website, and/or through any other methods. However, in other cases, the installation may automatically be scheduled by the TLM platform. Operation 704 may include, once the user performing the installation is at the physical location of the tank, confirming that the tank is the correct tank on which the TLM device is intended to be installed. For example, this verification may be performed by scanning a barcode on the tank (which may include identifying information about the tank) and/or capturing current location data and comparing the location data to a known location of the tank. For example, the location data may be determined using GPS coordinates associated with the mobile device running the mobile device application and/or through any other method.

Operations 706-708 may involve an activation process for activating the TLM device. In some cases, operation 706 and 708 may be performed before the user is physically next to the tank. Operation 706 may involve turning on the TLM device using a magnet. Operation 708 may involve verifying that an LED on the TLM device is turned on. For example, as described with respect to FIG. 2 and otherwise herein, the TLM device may include one or more LEDs to provide status indications to a user. One or all the LEDs may illuminate when the TLM device is turned on. Additionally, the one or more LEDs may illuminate a specific color when the device is turned on as well.

Operation 710 may involve installing the Rochester Ready Dial (if a Rochester Ready Dial is used) on the fuel tank gauge.

Operations 712-726 may involve installation steps performed to associate the TLM device and the tank with one another and/or with a user account. In this manner, once the installation is complete, the user may be able to access the user account through the mobile device application (and/or any other method) to view information about the TLM device and/or the tank. Particularly, operations 712-726 may involve steps performed when cellular service is available.

Operation 712 may involve opening the mobile device application. Operation 714 may involve turning on the TLM device again with the magnet for example, if the TLM device is no longer turned on). Operation 716 may involve associating the TLM device with the user account accessed through the mobile device application. For example, this association may be performed by scanning a code (such as a scannable QR code identifier or any other type of code) on the TLM device using the mobile device running the mobile device application. In some cases, upon scanning the code, the TLM device identifier may automatically be populated in the mobile device application. However, the association may also be performed in any other manner. The QR code may include information associated with the TLM device, such as serial number, revision, and a type of SIM card included in the device. Operation 718 may involve associating the tank with the TLM device and/or the user account accessed through the mobile device application. For example, the tank may also include a unique code that may be scanned by the mobile device. In some cases, upon scanning the code, the tank identifier may automatically be populated in the mobile device application. The tank may also be associated with the TLM device and/or the user account in any other manner as well. Furthermore, in scenarios where there is no code available on the tank, the mobile device application may provide the option for the user to create a new tank identifier to associated with the TLM device and/or the user account.

Operation 720 may involve confirming a location of the TLM device and the tank. Operation 722 may involve connecting a Hall Effect sensor to the Rochester Ready Dial. As aforementioned, the Hall Effect sensor may be used to detect the presence of a magnet proximate to the TLM device. Operation 724 may involve tapping the TLM device with the magnet to initiate the transmission of a data reading from the TLM device to the TLM platform (based on data obtained from the tank by the TLM device). Operation 726 may involve confirming that data was transmitted to the TLM platform. This may be accomplished by viewing the mobile device application to determine if the data associated with the TLM device and/or the tank has been updated on the mobile device application. Examples of different types of user interfaces that may be presented on the mobile device application are shown in FIGS. 4A-4E.

Operations 728-738 may involve installation steps performed when cellular service is not available. Operation 728 may involve turning the TLM device on using a magnet. Operation 730 may involve capturing an image or video of a device identifier associated with the TLM device the device identifier may be the code mentioned above or may be another identifier, such as a label including manufacturer details and other identifying information about the TLM device). Operation 732 may involve capturing an image of a device identifier associated with the tank. Operation 734 may involve manually recording a tank reading for example, recording a fuel level based on the gauge included on the tank). Operation 736 may involve connecting the Hall Effect sensor to the Rochester Ready Dial. Operation 738 may involve tapping the device with the magnet to initiate transmissions of a data reading from the tank.

Operations 740-450 may include installation steps performed subsequent to operation 738 when cellular service becomes available. Operation 740 may involve opening the mobile device application. Operation 742 may involve selecting an option in the application indicating that a particular LED or LEDs of the TLM device is/are turned on. Operation 744 may involve associating the TLM device with the user account accessed through the mobile device application. This association may be performed, for example, by uploading the images or videos that were captured of the TLM device identifier. Operation 746 may involve associating the tank with the TLM device and/or the user account accessed through the mobile device application. This association may be performed, for example, by uploading the images or videos that were captured of the tank identifier. Operation 748 may involve entering the location of the TLM device and tank (for example, into the mobile device application). Operation 750 may involve confirming that the data shown on the tank (for example, a fuel level shown on a fuel gauge of the tank) matches the a recorded reading by the TLM device.

In one or more embodiments, the TLM device may support a low power mode. In this low power mode, the TLM device may consume less than a threshold percentage of battery life over a given period of time. As one non-limiting example, the TLM device may consume no more than 1.25% of fully charged battery life per year. This low power mode may be enabled by default. The TLM device may also be associated with any other different types of power modes. For example, The TLM device may support being remotely placed into a "battery save" mode in which the TLM device may consume no more than 2.5% of fully charged battery life per year. However, these power modes are merely exemplary and the TLM device may include any other number of power modes as well. The TLM device may automatically switch between any of these power modes and/or a user may manually switch the TLM device between the power modes.

In one or more embodiments, the installation process may also involve communicating an indication of a success or failure of the installation process. During the installation process, the mobile device application may validate via the TLM platform that the TLM device, for example, successfully associated with the tank and the user account and is capable of transmitting data to the TLM platform. In some cases, the mobile device application may prompt the user to manually verify that the TLM device is connected. This may be accomplished, for example, by double tapping the TLM device to force a check-in event with the TLM platform then looking for green LED indicators associated with a NB-IoT connectivity indicator, a platform connectivity indicator and a gauge indicator. Any other number of LEDs may also be used for verification and any color illumination may also provide an indication of these features of the TLM device properly functioning. However, the manual verification may be performed in any other manner.

Figure 8:
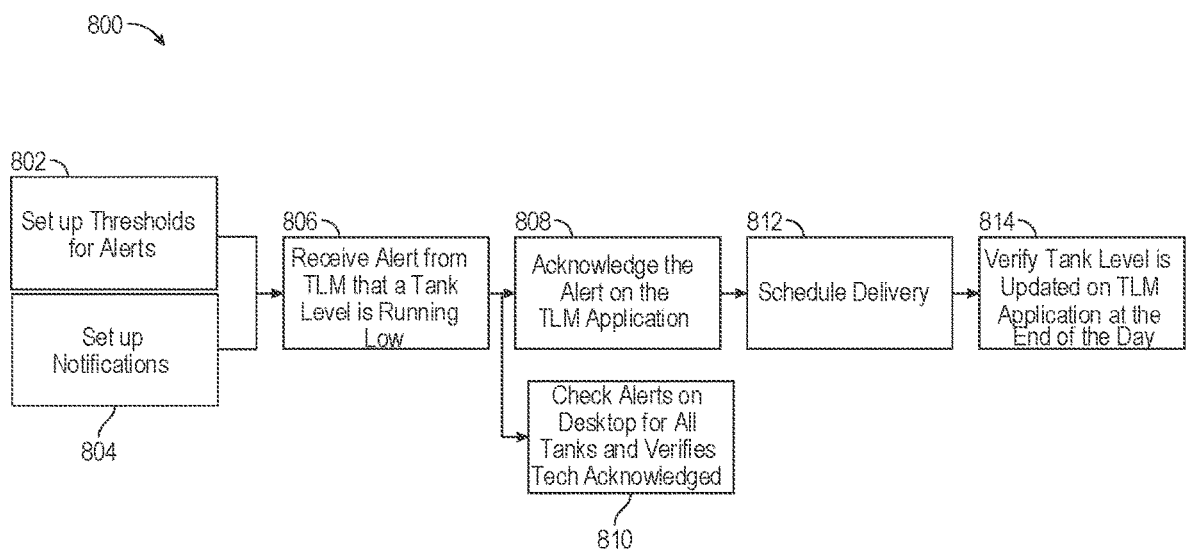
FIG. 8 depicts an example flow diagram for a tank refilling process, in accordance with one or more example embodiments of the disclosure.

FIG. 8 depicts an example flow diagram 800 for a tank refilling process, in accordance with one or more example embodiments of the disclosure. For example, flow diagram 800 may illustrate at least some of the steps involved in the process of refueling a tank that is determined to include less than a threshold amount of fuel remaining within the tank.

Operation 802 may involve establishing thresholds for alerts. Similarly operation 804 may involve establishing notifications. For example, as described with respect to the mobile device application user interfaces of FIGS. 4A-4E, the mobile device application may include settings that allow the user to configure conditions when a TLM device generates an alert for a particular tank. These alerts may be established based on any number of different types of conditions, such as a fuel level of a tank falling below a threshold remaining fuel level (in volume, percentage, or any other measure of remaining fuel), a predicted number of remaining days until the tank is out of fuel meeting or falling below a threshold number of remaining days, etc. These alerts may also be established in any other way beyond the settings of the mobile device application. For example, the user may establish the alerts through a website associated with the TLM platform, through the TLM device itself, and/or through any other method.

The operation of establishing notifications (operation 804) may involve determining the manner in which the alerts are provided to the user once they are established. For example, the alerts may be provided through a user interface of the mobile device application as shown in FIGS. 4A-4E. Alerts may also be provided as notifications through any other methods described herein or otherwise, such as a text message, an email, a notification through a website, and/or any other type of notification. In some cases, a user may select which of the different types of notifications they wish to receive when an alert is generated by a TLM device.

Operations 802 and 804 are followed by operation 806, which may involve receiving an alert from a TLM device. An example of an alert may include an indication that a fuel level in a tank is running low.

Operation 806 is followed by operations 808 and 810. Operation 808 may involve indicating an acknowledgment of the alert on a mobile device application. Alternatively, operation 810 may involve indicating acknowledgment of the alert on a different type of application, such as a website application, a desktop application, etc. For example, a user may interact with the notification on the mobile application to indicate acknowledgment of the alert. Upon acknowledgment, the user may be provided the option (for example, through the mobile device application) to schedule a refueling event for the tank in operation 812. Alternatively, in one or more embodiments, the TLM platform and/or the mobile device application itself may automatically schedule a refueling event for the tank without requiring manual intervention from the user.

Operation 812 is followed by operation 814, which may involve verifying that the fuel level of the tank is updated on the mobile device application. That is, the mobile device application may present fuel level information for individual tanks that are associated with the particular user's mobile device application account. Before the refueling event occurs, the mobile device application may display an alert and an indication that the fuel level of the tank is below a threshold fuel level. After the refueling of the tank occurs, the mobile device application should be updated to indicate that the fuel level for the tank is now at maximum fuel level (or any other level that the tank was refilled to during the refueling process).

Figure 9:
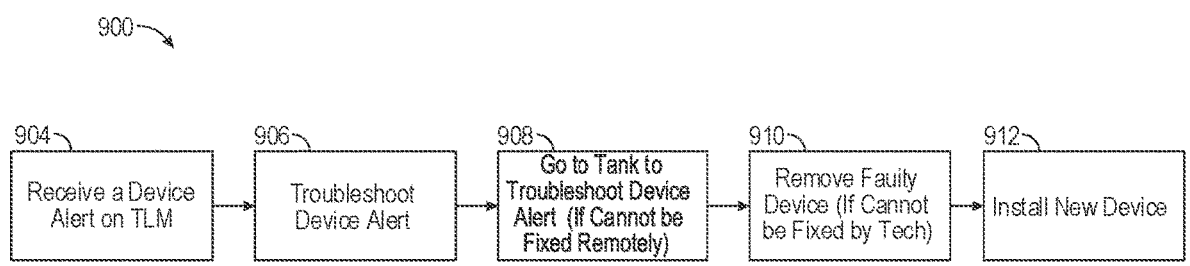
FIG. 9 depicts an example flow diagram for a tank level monitoring device troubleshooting process, in accordance with one or more example embodiments of the disclosure.

FIG. 9 depicts an example flow diagram 900 for a tank level monitoring device troubleshooting process, in accordance with one or more example embodiments of the disclosure.

Operation 904 may involve receiving an alert associated with TLM device. For example, the alert may be displayed to a user through a mobile device application, desktop application, website application, etc. Operation 906 may involve performing a remote troubleshooting process for the TLM device. In some cases, the remote troubleshooting process may be performed automatically by the TLM platform. For example, the TLM platform may send a signal to reboot the TLM device and/or perform any other types of functions to attempt to resolve any issues with the TLM device. Operation 908 may involve a technician or other user troubleshooting the TLM device at the physical location in which the TLM device is installed. Operation 910 may involve removing the TLM device if it is determined that the TLM device is faulty. Operation 912 may involve installing a new TLM device and associating the new TLM device with the tank.

Figure 10:
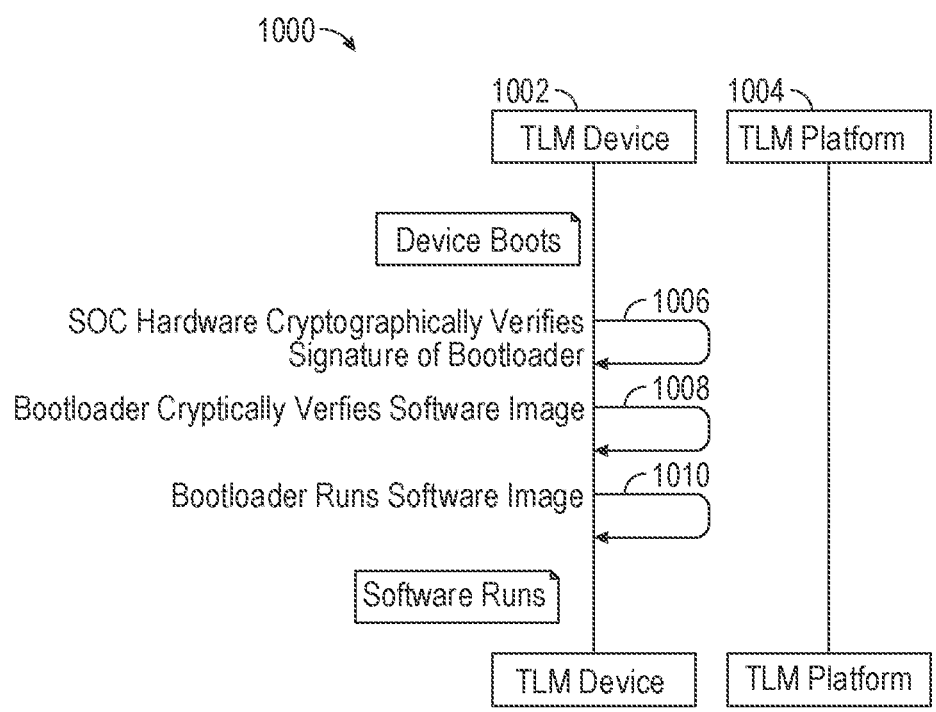
FIG. 10 depicts an example flow diagram for a secure boot process, in accordance with one or more example embodiments of the disclosure.

FIG. 10 depicts an example flow diagram 1000 for a secure boot process, in accordance with one or more example embodiments of the disclosure.

In order to ensure a TLM device 1002 is running official software and/or firmware, a secure boot process may be used. If the verification of the bootloader fails, the TLM device 1002 may display an error and may be made non-operational. In such cases, the TLM device 1002 may also download another software image. Any errors pertaining to secure boot may also be made visible through the LEDs on the TLM device 1002 (and/or may be made visible through any other suitable method).

The flow diagram 1000 includes operations involve a TLM device 1002 and/or a TLM platform 1004. The flow diagram 1000 may begin with operation 1006, which may involve the TLM device 1002 cryptographically verifying the signature of the bootloader. Operation 1008 may involve the TLM device 1002 cryptically verifying the software image through the bootloader. Operation 1010 may involve TLM device 1002 running the software image through the bootloader.

In some cases, software images for the TLM device may be signed based on certain criteria being satisfied. This criteria may include not signing arbitrary software images and not signing development and debug images, to name a few non-limiting examples. As a result of not signing development/debug images, two variants of the TLM device may be considered: a development variant and a production variant. The development variant may not follow the secure boot procedure while the production variant may enforce secure boot. The private key used for signing images may be kept under strict access control. In some cases, this key may be stored in an HSM (hardware secure module).

Figure 11:
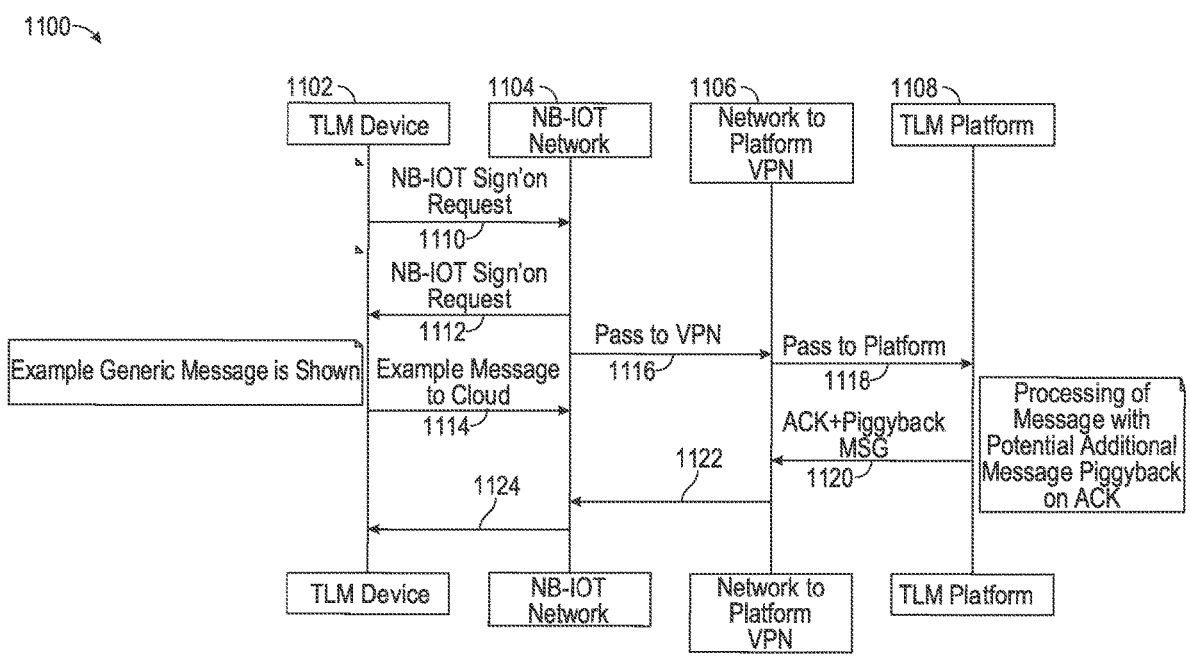
FIG. 11 depicts an example flow diagram for a NB-IoT access process, in accordance with one or more example embodiments of the disclosure.

FIG. 11 depicts an example flow diagram 1100 for a NB-IoT access process, in accordance with one or more example embodiments of the disclosure.

The flow diagram 1100 may include operations involving at least a TLM device 1102, a NB-IoT network 1104 (it should be noted that while reference are be made to a NB-IoT network in several of the figures herein, any other type of network may also be applicable as well), a virtual private network (VPN) 1106, and/or a TLM platform 1108. The TLM device 1102 and the TLM platform 1108 may perform communications via the NB-IoT access network 1104. This may require the TLM device 1102 being admitted to the NB-IoT access network 1104 as well as the NB-IoT access 1104 network providing connectivity to the TLM platform 1108.

In one or more embodiments, at least two options may exist (however, these provided options are not intended to be limiting) for NB-IoT access between the TLM device 1102 and the TLM platform 1108: (1) public internet and (2) private network. If the NB-IoT network 1104 is setup in the "public internet" manner, the TLM device 1102 may effectively be able to communicate with any device on the Internet. However, this TLM device 1102 may be behind a firewall and some variant of port address translation. The impact of this configuration is that the TLM device 1102 can communicate at any time, but the TLM platform 1108 may not be able to initiate communication with the TLM device 1102.

If the NB-IoT network 1104 is setup in the "private network" manner, the TLM device 1102 may effectively be on a private subnet. This private subnet may be connected to the TLM platform 1108 through a VPN 1106. This configuration provides additional device and platform security by ensuring the device can only communicate with the TLM platform. This configuration also allows, from a network perspective, the TLM platform 1108 to initiate communication with a TLM device 1102 at any time.

Turning to the flow diagram 1100, operation 1110 may involve transmitting a NB-IoT sign-on request from the TLM device 1102 to the NB-IoT network 1104. Operation 1112 may involve transmitting a NB-IoT sign-on response from the NB-IoT network 1104 to the TLM device 1102. Operation 1114 may involve transmitting a message from the TLM device 1102 to the NB-IoT network 1104. Operation 1116 may involve transmitting the message from the NB-IoT network 1104 to the VPN 1106. Operation 1108 may involve transmitting the message from the VPN 1106 to the TLM platform 1108. Operation 1120 may involve providing an acknowledgement from the TLM platform 1108 to the VPN 106 and piggybacking the message. For example, piggybacking may refer to sending an acknowledgement to the original message and also including a new message along with the acknowledgement. Operation 1122 may involve transmitting the acknowledgement and message from the VPN 1106 to the NB-IoT network 1104. Operation 1124 may involve transmitting the acknowledgement and the message from the NB-IoT 1104 back to the TLM device 1102.

Figure 12:
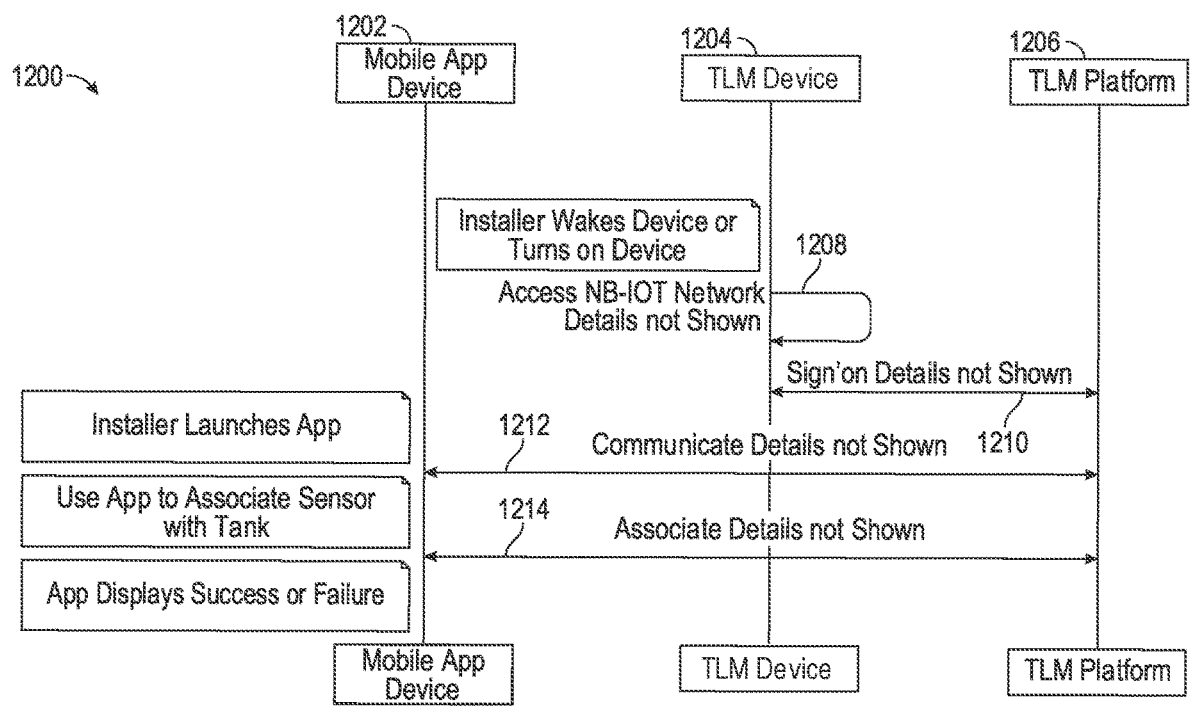
FIG. 12 depicts an example flow diagram for a tank level monitoring device activation process, in accordance with one or more example embodiments of the disclosure.

FIG. 12 depicts an example flow diagram 1200 for a TLM device activation process, in accordance with one or more example embodiments of the disclosure.

The flow diagram 1200 may include operations involving at least a mobile application device 1202, a TLM device 1204, and/or a TLM platform 1206. During the TLM device installation process, the TLM device 1204 may be activated. The activation process may involve using the TLM platform 1206 to associate the TLM device 1204 with the fuel tank on which the TLM device 1204 will be installed. Once this association has been established, the TLM platform 1206 may then be able to correlate alerts and events from a TLM device 1204 with the specific tank and customer account (such that the information obtained from the tank by the TLM device 1204 may then be viewed by a user through the mobile application device 1202, for example).

Turning to the flow diagram 1200, operation 1208 may involve accessing, by the TLM device 1204, the NB-IoT network. Operation 1210 may involve sending a sign-on request from the TLM device 1204 to the TLM platform 1206. Operation 1212 may involve performing a communication between the TLM platform 1206 and the mobile application device 1202. Operation 1214 may involve establishing the association between the TLM device 1204 and a particular tank.

Figure 13:
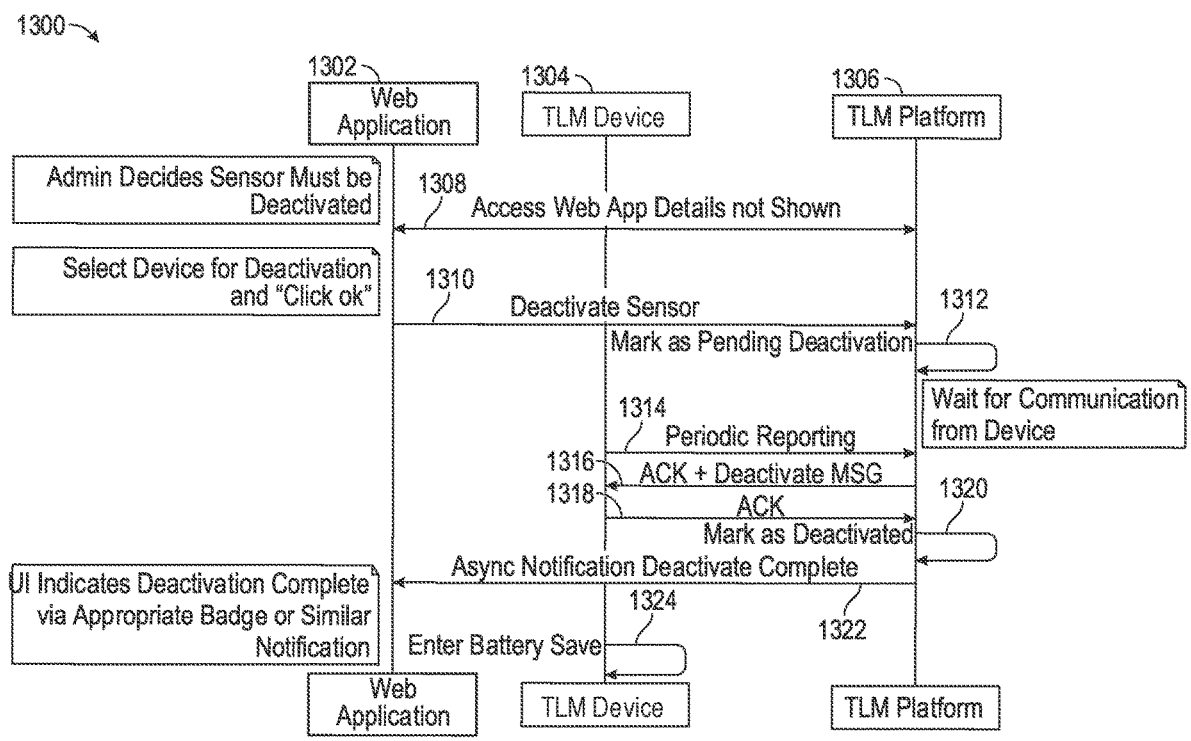
FIG. 13 depicts an example flow diagram for a tank level monitoring device deactivation process, in accordance with one or more example embodiments of the disclosure.

FIG. 13 depicts an example flow diagram 1300 for a tank level monitoring device deactivation process, in accordance with one or more example embodiments of the disclosure.

The flow diagram 1300 may include operations involving at least a web application 1302 (while reference is made herein to a web application, a mobile application may similarly be used as well), a TLM device 1304, and/or a TLM platform 1306. Deactivation occurs when a TLM device 1204 should no longer be associated with a tank. This can occur because the TLM device 1204 is being replaced (failed hardware or other reason) or because the customer is no longer paying for the service.

Turning to the flow diagram 1300, operation 1308 may involve a user accessing a web site application 1302, which may involve communications between the website application 1302 and the TLM platform 1306. Similar operations may be applicable to a mobile device application and/or any other application that is accessible from any type of system, device, etc. Operation 1310 may involve transmitting, from the website application 1302 to the TLM platform 1306, an indication that the TLM device 1304 should be deactivated. Operation 1312 may involve the TLM platform 1306 waiting for communication from the TLM device 1304. Operation 1314 may involve receiving, by the TLM platform 1306 and from the TLM device 1304, a periodic reporting. Operation 1316 may involve the TLM platform 1306 transmitting to the TLM device 1304 an acknowledgement of the reporting and a deactivation message. Operation 1318 may involve the TLM device 1304 transmitting an acknowledgement to the TLM platform 1306. Operation 1320 may involve the TLM platform 1306 indicating that the TLM device 1304 is now marked as deactivated. Operation 1322 may involve the TLM platform 1306 transmitting a notification to the web application 1302 that the deactivation has been completed. Operation 1324 may involve the TLM device 1304 entering a battery saving mode.

Figure 14:
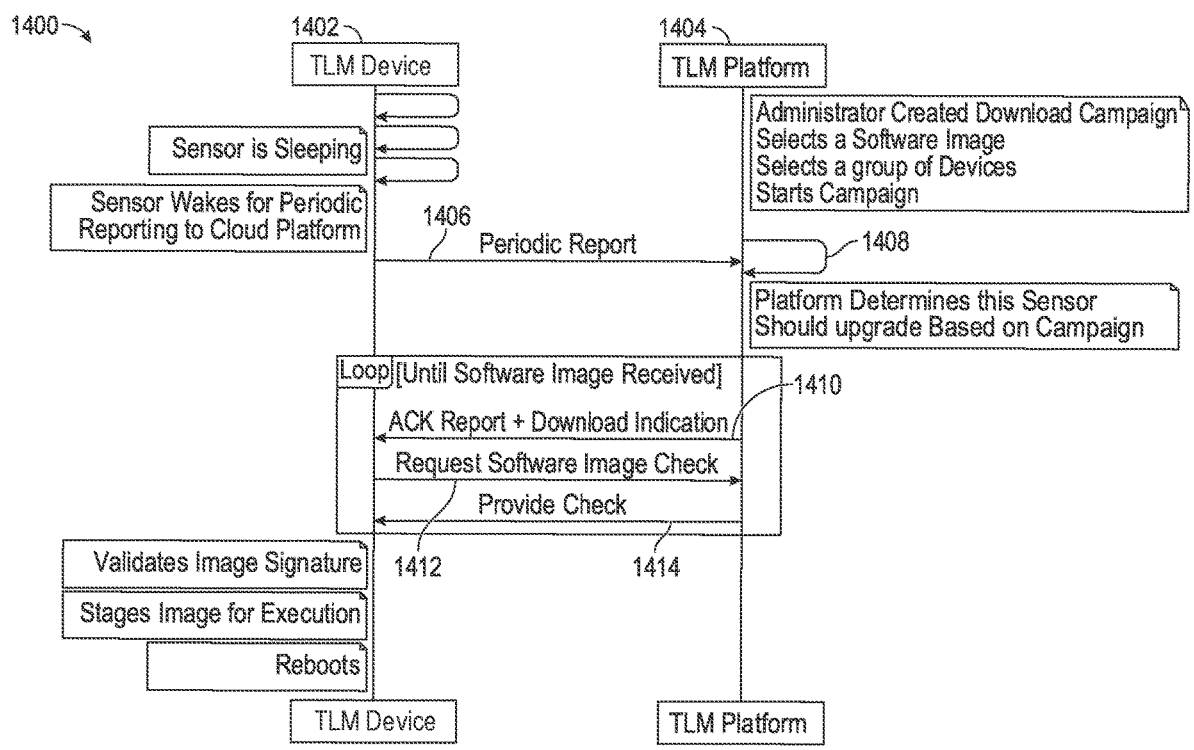
FIG. 14 depicts an example flow diagram for a tank level monitoring device software download process, in accordance with one or more example embodiments of the disclosure.

FIG. 14 depicts an example flow diagram 1400 for a tank level monitoring device software download process, in accordance with one or more example embodiments of the disclosure.

The flow diagram 1400 may include operations involving at least a TLM device 1402 and/or a TLM platform 1404. Robust over-the-air software download may be important to the success of the product. The distribution of the software image to the device may consider the impact of NB-IoT constrained bandwidth. Reduction of the software image size has great benefits. The TLM platform may benefit from knowing the current operating software version for some or all devices. This information may be included when the device signs onto the network and accesses the TLM platform. This information may also be available on demand through a TLM platform to device API. The TLM platform may provide an administrator (or any other user) a method to create a download campaign. A download campaign may define a group of devices that should receive a specific version of firmware over a specific period of time. The TLM platform may be able to display all devices running a certain version of code as well as the code for a specific device. The TLM platform may only allow signed images to be sent to production devices. The TLM devices 1402 may remain operational during NB-IoT software download.

Turning to the flow diagram 1400, operation 1402 may involve the TLM device 1402 waking up and transmitting a periodic report to the TLM platform 1404. That is, in one or more embodiments, the TLM device 1406 may remain in a low-power sleep state to avoid draining the battery of the TLM device 1402. However, the TLM device 1402 may transition into a higher-power state ("wake-up") at particular intervals to obtain data from the tank and provide the data in the periodic report. Such intervals may be user-defined and/or automatically established by the TLM platform 1404, the TLM device 1402, and/or any other device or system. Operation 1408 may involve the TLM platform 1404 determining that the TLM device 1402 may require a software update.

Following operation 1408, a loop involving operations 1410-1414 may be performed until the software image is received by the TLM device 1402. Within the loop, operation 1410 may involve the TLM platform 1404 transmitting an acknowledgement of the periodic report and an indication that a download will be provided to the TLM device 1402. Operation 1412 may involve the TLM device 1402 requesting a portion of the software image from the TLM platform 1404. Operation 141 may involve the TLM platform 1404 transmitting the requested portion to the TLM device 1402.

Once the loop is completed and all of the software image has been transmitted to the TLM device 1402 by the TLM platform 1404, the TLM device 1402 may undertake operations 1416-1420 to perform the software update. Operation 1416 may involve the TLM device 1402 validating a signature of the software image. Operation 1418 may involve the TLM device 1402 storing the software image for execution. Operation 1420 may involve the TLM device rebooting to complete the software update.

In some cases, an error may occur during the software update. However, the TLM device 1402 software upgrade process should prevent rollback. Additionally, signed software image that is older than the current software image may, in some cases, not be installed.

Figure 15:
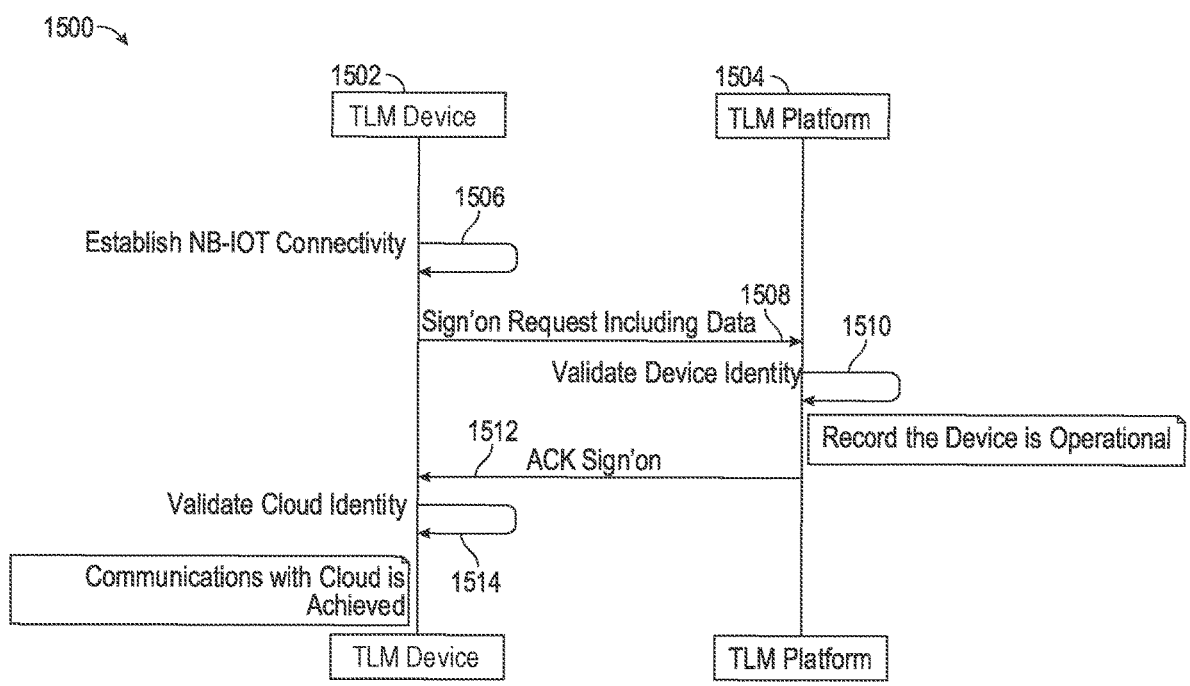
FIG. 15 depicts an example flow diagram for a TLM platform sign-on process, in accordance with one or more example embodiments of the disclosure.

FIG. 15 depicts an example flow diagram 1500 for a TLM platform sign-on process, in accordance with one or more example embodiments of the disclosure.

The flow diagram 1500 may include operations involving at least a TLM device 1502 and/or a TLM platform 1504. After the TLM device 1502 boots and has established NB-IoT connectivity, the TLM device 1502 may need to sign-on to the TLM platform 1504. This process may involve the TLM platform validating the identity of the TLM device 1502 and the TLM device 1502 validating the identity of the TLM platform 1504.

Assuming validation success, the sign-on may then provide an indication to the TLM platform 1504 that TLM device 1502 is live and may also provide operational data. For example, current software version, hardware revision, and/or a reason the sign-on is occurring (for example, power loss, first boot, software bug/reboot, etc.).

Turning to the flow diagram 1500, operation 1506 may involve the TLM device 1502 establishing NB-IoT connectivity. Operation 1508 may involve the TLM device 1502 transmitting a sign-on request to the TLM platform 1504. The sign-on request may include data. Operation 1510 may involve the TLM platform 1504 validating the identity of the TLM device 1502. The TLM platform 1504 may also record that the TLM device 1502 is operational. Operation 1512 may involve the TLM platform 1504 sending an acknowledgement to the TLM device 1502. Operation 1514 may involve the TLM device 1502 validating the cloud identity.

Figure 16:
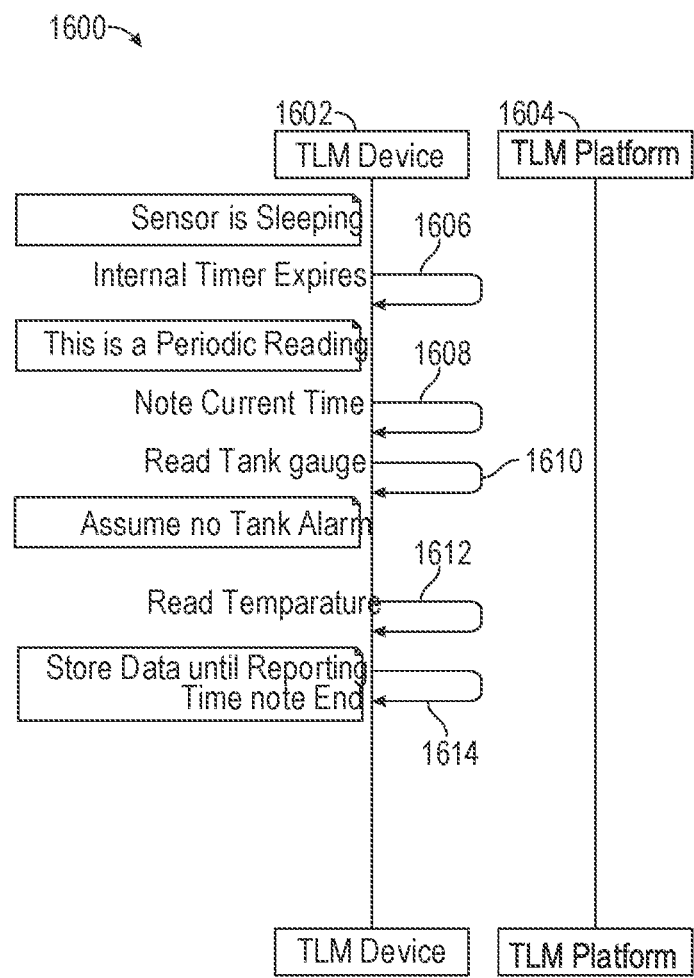
FIG. 16 depicts an example flow diagram for tank level monitoring device sensor behavior, in accordance with one or more example embodiments of the disclosure.

FIG. 16 depicts an example flow diagram 1600 for tank level monitoring device sensor behavior, in accordance with one or more example embodiments of the disclosure.

The flow diagram 1600 may include operations involving at least a TLM device 1602 and/or a TLM platform 1604. In one or more embodiments, important actions performed by the TLM device 1602 may include recording and reporting of tank fuel levels. It may also be important for the TLM device 1602 to record and report other types of data as well, such as temperature levels. In order to conserve battery and achieve a lengthy battery lifetime, the TLM device 1602 may be configured to remain within a low-power "sleep" state as often as possible. The TLM device 1602 may transition from this sleep state to a higher-powered state, for example, if there is an accelerometer event. This transition may also occur at pre-determined intervals at which the TLM device 1602 is configured to wake to record and reporting data from a tank.

Turning to the flow diagram 1600, operation 1606 may involve the TLM device 1602 determining that an internal timer has expired. For example, the TLM device 1602 (and/or any other TLM device described herein) may primarily operate in a low-power "sleep" mode. The TLM device 1602 may be placed in this sleep mode to improve the longevity of the battery used to power the TLM device 1602. However, the TLM device 1602 may be transitioned into a higher power mode (for example, "wake" from the sleep mode) at various intervals to perform functions such as capturing data from the tank, transmitting data to the TLM platform 1604, generating alerts, and/or performing any other functions.

The interval may be a pre-determined, periodic time interval that may be manually established by a user and/or automatically determined by the TLM platform 1604 (or the TLM device 1602). For example, a user may indicate, through a mobile device application (or in any other manner), that the interval should be an hour, a day, and/or any other amount of time. The user may also be able to modify the interval at any given time. If the interval is automatically determined, the interval may be stablished based on any number of factors. The interval may also be modified based on any number of factors as well. As one non-limiting example, the interval may be modified to provide for more frequent data collection when a tank is closer to a low or empty fuel level. After these functions are performed, the TLM device 1602 may transition back to the sleep mode.

Operations 1608 and 1610 may be operations associated with performing a periodic reading performed by the TLM device 1602. Operation 1608 may involve determining a current time. Operation 1610 may involve obtaining data from the tank, such as, for example, tank gauge data. Operation 1612 may involve reading a temperature value. Any other data values may also be obtained from the TLM device 1602, the tank, the environment in which the TLM device 1602 and the tank exist, etc. Operation 1614 may involve the TLM device 1602 storing the data obtained through operations 1608-1612 and otherwise. The data may be stored in the TLM device 1602, for example, until the data is reported to the TLM platform 1604.

In one or more embodiments, the TLM device 1602 may record data associated with the tank periodically (for example, every hour, every day, etc.). The TLM device 1602 may record the time at which data is obtained from the tank (for example, so that the data may be timestamped for more effective usage of the data). The TLM device 1602 may also record accelerometer events that surpass configured thresholds. The TLM device may include an accelerometer that may be used to detect when the device is removed (for example, stolen) from the fuel tank.

Figure 17:
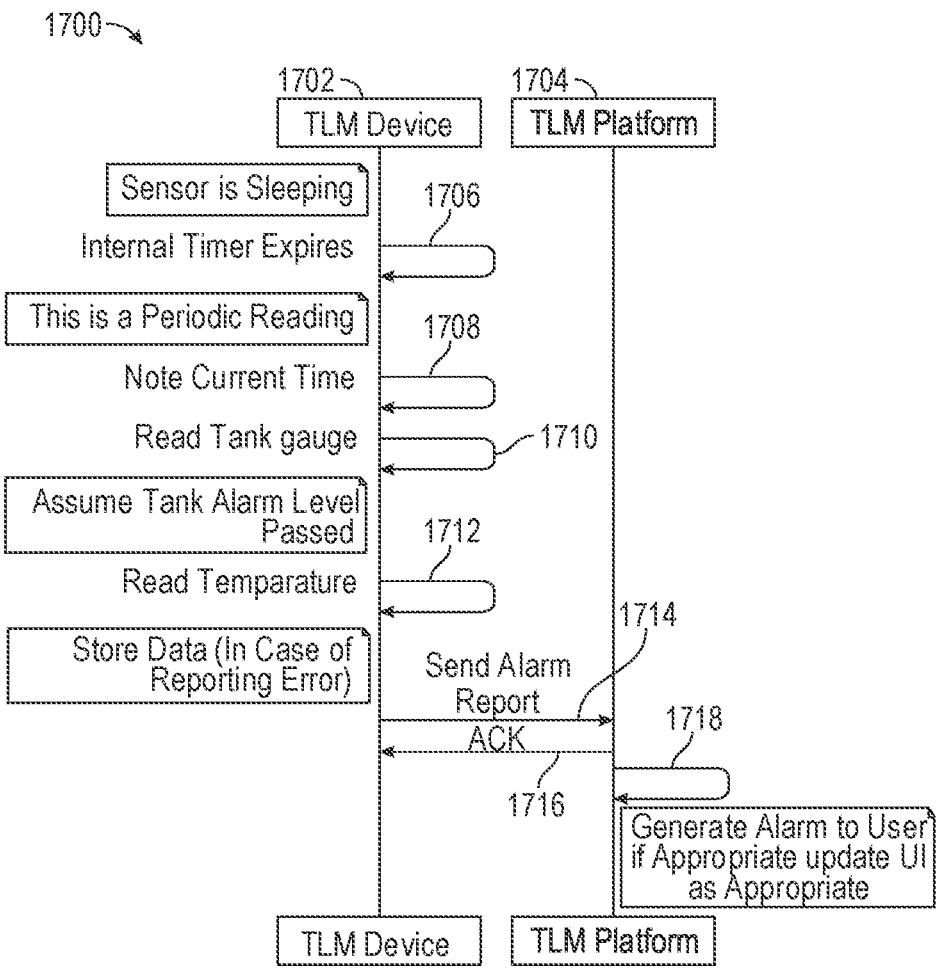
FIG. 17 depicts an example flow diagram for tank level monitoring device sensor alert behavior, in accordance with one or more example embodiments of the disclosure.

FIG. 17 depicts an example flow diagram 1700 for tank level monitoring device sensor alert behavior, in accordance with one or more example embodiments of the disclosure.

The flow diagram 1700 may include operations involving at least a TLM device 1702 and/or a TLM platform 1704. Operation 1706 may involve the TLM device 1702 determining that an internal timer has expired. Operations 1708 and 1710 may be operations associated with performing a periodic reading by the TLM device 1702. Operation 1708 may involve determining a current time. Operation 1710 may involve obtaining data from the tank, such as, for example, tank gauge data. Operation 1712 may involve reading a temperature value. If the tank fuel level satisfies one of the defined alert thresholds, the device may provide an indication of the alert immediately to the TLM platform 1704 rather than waiting for the next scheduled periodic reporting time. Operation 1714 may involve the TLM device 1702 transmitting an alert report to the TLM platform 1704. Operation 1716 may involve the TLM platform 1704 transmitting an acknowledgement of the alert report to the TLM device 1702. Operation 1718 may involve the TLM platform 1704 storing the data and generating an alert to transmit for presentation to a user (for example, through a mobile device application, website application, etc.).

In one or more embodiments, when the TLM device 1602 performs periodic tank readings, the TLM device 1602 may immediately generate an alert if a tank alert level has been satisfied and the tank alert is enabled. When the TLM device 1602 performs its periodic tank readings, the TLM device 1602 may immediately generate an alert if a temperature alert level has been passed and the temperature alert is enabled. When the TLM device 1602 performs its periodic tank readings, TLM device 1602 may immediately generate an alert if an accelerometer alert level has been passed and the accelerometer alert is enabled. However, the alerts may also be generated on any amount of delay as well.

The TLM platform may support configuring multiple different alert levels. For example, a first alert may be configured to be presented to a user when a fuel level crosses a first threshold, a second alert may be configured to be presented to the user when the fuel level crosses a second threshold, etc. The alerts may also be configured on a device type basis or on an individual tank basis. The alerts may also be configurable in any other manner. For example, alerts may be applied to filtered subsets of tanks based on any number of filtering criteria. Alerts may be configurable to be presented only within certain time frames, days of the week, weeks of the year, etc. Alerts may also be configurable in any other manner as well.

Figure 18:
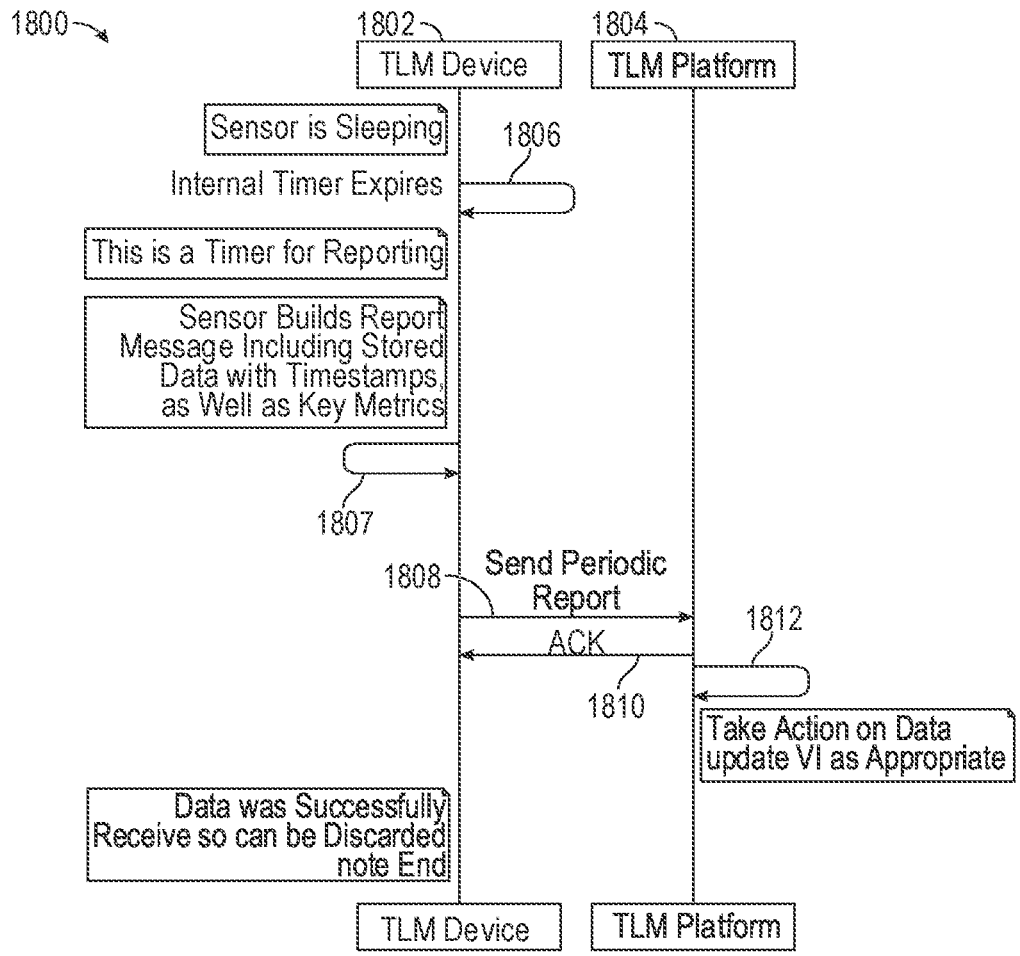
FIG. 18 depicts an example flow diagram for a tank level monitoring device reporting process, in accordance with one or more example embodiments of the disclosure.

FIG. 18 depicts an example flow diagram 1800 for a tank level monitoring device reporting process, in accordance with one or more example embodiments of the disclosure.

The flow diagram 1800 may include operations involving at least a TLM device 1802 and/or a TLM platform 1804. When a reporting time interval arrives, the TLM device 1802 may report the stored data obtained from the tank to the TLM platform 1804. Additionally, certain key metrics such as NB-IoT quality (RSRP, RSRQ) and device uptime may be reported. If the TLM device 1802 is unable to report as scheduled, or is unable to report an alert, this unreported data may be stored and reported at a future time.

Turning to the flow diagram 1800, operation 1806 may involve the TLM device 1802 determining that an internal timer has expired. Operation 1807 may involve the TLM device 1802 generating a report message. For example, the report message may include any data obtained by the TLM device 1802 from the tank (and/or any other types of data) since the prior reporting period. The message may also include any timestamps associated with the data as well. Operation 1808 may involve the TLM device 1802 transmitting the data to the TLM platform 1804. Operation 1810 may involve the TLM platform 1804 transmitting an acknowledgement message back to the TLM device 1802. Operation 1812 may involve the TLM platform 1804 storing the data.

In one or more embodiments, the TLM device 1802 may default to reporting tank data twice a day, for example (or at any other interval). In configurations in which the TLM device 1802 reports twice a day, the TLM device 1802 may default to including 12 hourly tank readings in each report. A report may include the TLM device's association status. A report may also include any "error readings," such as a lost connection to the tank gauge, a dropped TLM device 1802 (for example, accelerometer movement detected following the installation process), no data available, loss of signal, low signal strength, low battery level, etc. A report may also include the TLM device's battery level. A device report may also include all recorded tank data (and any timestamps). A device report may also include all recorded temperature readings (and any timestamps). A device report may also include the current network quality metrics. The TLM device 1802 may report connectivity loss to the TLM platform 1804 periodically (for example, every 12 hours). The TLM device 1804 may report reboots and allow the TLM platform 1804 to generate software stability reports. A device report may also include any indications that accelerometer data exceeds any defined thresholds. A device report may also include any other information.

Figure 19:
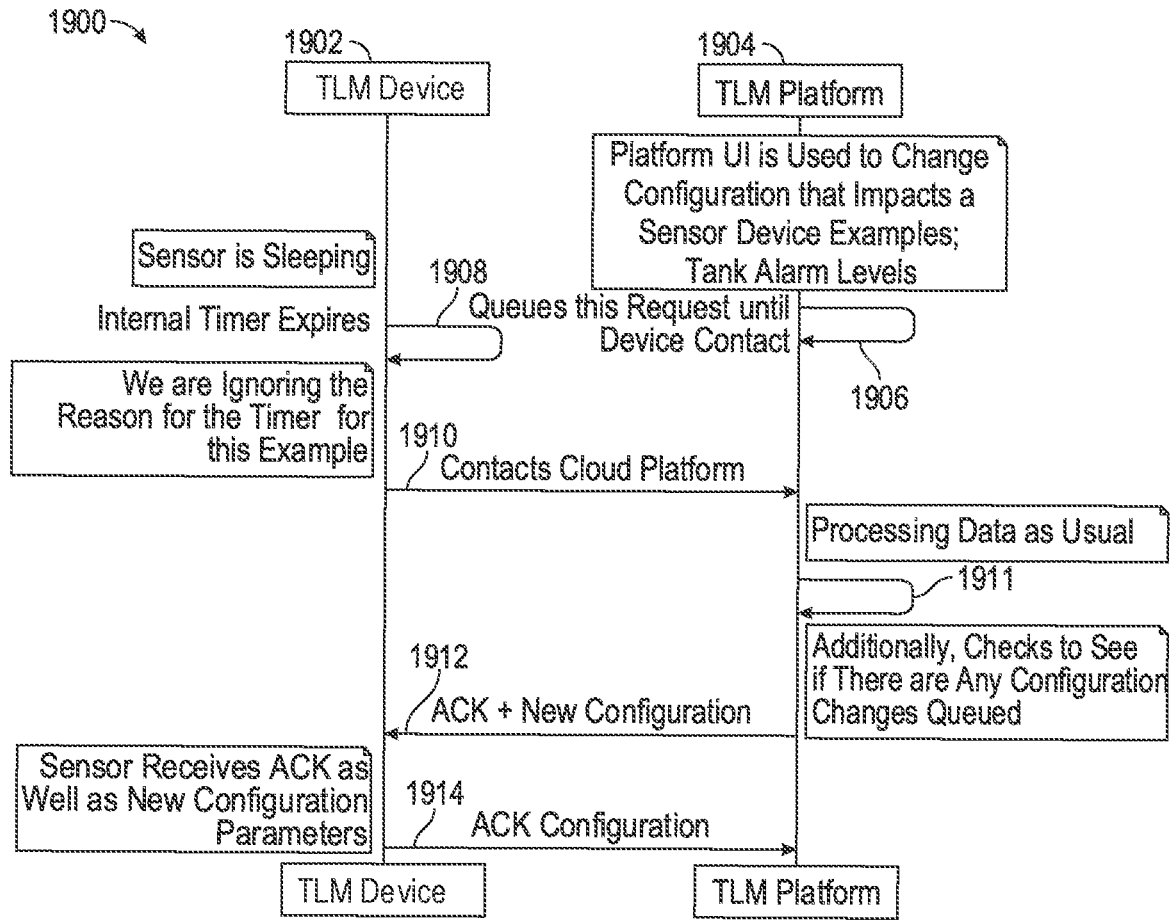
FIG. 19 depicts an example flow diagram for a tank level monitoring device configuration process, in accordance with one or more example embodiments of the disclosure.

FIG. 19 depicts an example flow diagram 1900 for a tank level monitoring device configuration process, in accordance with one or more example embodiments of the disclosure.

The flow diagram 1900 may include operations involving at least a TLM device 1902 and/or a TLM platform 1904. In one or more embodiments, the TLM platform 1904 may be able to configure at least the following capabilities of the sensor device: frequency of sensor readings, frequency of reporting to the TLM platform 1804, individual alert levels for the tank, accelerometer sensitivity, etc.

Turning to the flow diagram 1900, operation 1906 may involve queuing a request to modify a TLM device 1902 configuration. Operation 1908 may involve the TLM device 102 determining that an internal timer has expired. Operation 110 may involve the TLM deice 1902 initiating communications with the TLM platform 1904. Operation 1911 may involve the TLM platform 1904 checking to determine if there are any configuration changes queued. Operation 1912 may involve the TLM platform 1904 transmitting and acknowledgement and an indication of the new configuration to the TLM device 1902. Operation 1914 may involve the TLM device 1902 sending an acknowledgment of the new configuration to the TLM platform 1904.

Given that the TLM device 1902 is often in a low power sleep mode, the TLM platform 1904 may be configured to queue requests for individual TLM devices. The TLM platform 1904 may be able to display whether a configuration for a device is "pending" or has been acknowledged by the device. The TLM platform 1904 may receive account and tank information. Additionally, the TLM platform 1904 may provide tank level readings. In one or more embodiments, two methods may be used: manual exchange of data files via (for example, via "FTP") and REST-like data exchange.

For the "manual" process, the TLM platform 1804 may support an account import operation. This process may bring account and tank information into the TLM platform 1804. For the "manual" process, the TLM platform 1804 may generate a report of tank readings and store this report in a location that can be accessed by the system. The file may include multiple readings for each tank based on the data reported from each sensor. To account for manual errors, the TLM platform 1804 may have the ability to generate reports across arbitrary timeframes.

With respect to the REST-like approach, the TLM platform 1804 may support securely connecting to a system and pushing data as it becomes available (ex: HTTP POST). The TLM platform 1804 may support a backlog of data that needs to be transmitted to the system, including data that was not successfully transmitted, and continue attempts to transmit this data. The TLM platform 1804 may support reports which including failed exchanges and size of backlog. For the REST-like approach, the TLM platform 1804 may accept incoming connections that are secured and authenticated. This path allows the system to push data into the TLM platform 1804, such adding accounts and removing accounts.

Whether the manual or REST-Like process is used, operational details for various situations may be established. For example, differences between data within the system and data imported into the system may be used to generate an "exception" report that may identify tanks that need to be monitored (e.g., tanks in import data and not in the system) or tanks that need to be added to routing planning (e.g., tanks in the system, but not in import data). Other discrepancies may be identified such as location discrepancies, tank sizes, refuel frequencies, etc.

The TLM device 1902 may maintain and report key operational metrics such as, for example, device uptime (how many hours since last reboot), a reason for last reboot (power outage, software bug/reset, software upgrade, etc.), NB-IoT quality (RSRQ, RSRP, other data available from module), data pertaining to retry attempts for specific messages (no ACK received), etc.

In one or more embodiments, the TLM device 1902 may support runtime configuration of report intervals by the TLM platform 1904. The TLM device 1902 may also support runtime configuration of samples per report interval by the platform. The TLM device 1902 may support runtime configuration of the multiple levels of tank alerts by the TLM platform 1904. The TLM device 1902 may support runtime configuration of the temperature level alerts by the TLM platform 1904. The TLM device 1902 may support enabling and disabling of tank level alerts by the platform. The TLM device 1902 may support enabling and disabling of temperature level alerts by the platform. The TLM device 1902 may support enabling and disabling of accelerometer alerts by the platform. The TLM device 1902 may support runtime configuration of the multiple accelerometer level alerts by the platform. This may be used to refine what is considered a "fall from the tank" or other events. The TLM device 1902 may support a runtime "factory reset" which returns all persistent states, except for firmware image, to the factory defaults.

FIG. 20 depicts a schematic illustration of an example method 2000, in accordance with one or more example embodiments of the disclosure.

Block 2002 of the method 2000 may include receiving, by a remote server and from a first tank level monitor (TLM) device disposed on a first fuel tank and at a first time, a first fuel level of the first fuel tank. Block 2004 of the method may include receiving, from a second TLM device disposed on a second fuel tank, a second fuel level of the second fuel tank. Block 2006 of the method 2000 may include determining that the first fuel level is less than or equal to a threshold fuel level and the second fuel level is above the threshold fuel level. Block 2008 of the method 2000 may include automatically generating, a refueling schedule associated with that includes the first fuel tank instead of the second fuel tank.

One or more operations of the methods, process flows, or use cases of FIGS. 1-20 may have been described above as being performed by a user device, or more specifically, by one or more program module(s), applications, or the like executing on a device. It should be appreciated, however, that any of the operations of the methods, process flows, or use cases of FIGS. 1-20 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-20 may be described in the context of the illustrative devices, it should be appreciated that such operations may be implemented in connection with numerous other device configurations.

The operations described and depicted in the illustrative methods, process flows, and use cases of FIGS. 1-20 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

FIG. 21 depicts a schematic illustration of an example computing device 2100, in accordance with one or more example embodiments of the disclosure. The computing device 2100 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The computing device 2100 may correspond to an illustrative device configuration for the devices of FIGS. 1-3 and/or any other figures. For example, the TLM device 140, server 160, devices 110(1) . . . 110(N), etc.

The computing device 2100 may be configured to communicate via one or more networks with one or more servers, search engines, user devices, or the like. In one or more embodiments, a single remote server or a single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 2100 may include one or more processors (processor(s)) 2102, one or more memory devices 2104 (generically referred to herein as memory 2104), one or more input/output (I/O) interface(s) 2106, one or more network interface(s) 2108, one or more sensors or sensor interface(s) 2110, one or more transceivers 2112, one or more optional speakers 2114, one or more optional microphones 2116, and data storage 2120. The computing device 2100 may further include one or more buses 2118 that functionally couple various components of the computing device 2100. The computing device 2100 may further include one or more antenna(e) 2134 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 2118 may include at least one of a system bus, the memory bus, an address bus, or a message bus, and may permit exchange of information (e.g., data (including computer-executable code), signaling, etc.) between various components of the computing device 2100. The bus(es) 2118 may include, without limitation, the memory bus or the memory controller, a peripheral bus, an accelerated graphics port, and so forth. The bus(es) 2118 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 2104 of the computing device 2100 may include volatile memory (memory that maintains its state when supplied with power) such as random-access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 2104 may include multiple different types of memory such as various types of static random-access memory (SRAM), various types of dynamic random access memory (DRAM), various types of unalterable ROM, and/or writeable variants of ROM such as electrically erasable programmable read-only memory (EEPROM), flash memory, and so forth. The memory 2104 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 2120 may include removable storage and/or non-removable storage including, but not limited to, magnetic storage, optical disk storage, and/or tape storage. The data storage 2120 may provide non-volatile storage of computer-executable instructions and other data. The memory 2104 and the data storage 2120, removable and/or non-removable, are examples of computer-readable storage media (CRSM) as that term is used herein.

The data storage 2120 may store computer-executable code, instructions, or the like that may be loadable into the memory 2104 and executable by the processor(s) 2102 to cause the processor(s) 2102 to perform or initiate various operations. The data storage 2120 may additionally store data that may be copied to memory 2104 for use by the processor(s) 2102 during the execution of the computer-executable instructions. Moreover, output data generated as a result of execution of the computer-executable instructions by the processor(s) 2102 may be stored initially in memory 2104, and may ultimately be copied to data storage 2120 for non-volatile storage.

More specifically, the data storage 2120 may store one or more operating systems (O/S) 2122; one or more database management systems (DBMS) 2124; and one or more program module(s), applications, engines, computer-executable code, scripts, or the like such as, for example, one or more TLM module(s) 2126. Some or all of these module(s) may be sub-module(s). Any of the components depicted as being stored in data storage 2120 may include any combination of software, firmware, and/or hardware. The software and/or firmware may include computer-executable code, instructions, or the like that may be loaded into the memory 2104 for execution by one or more of the processor(s) 2102. Any of the components depicted as being stored in data storage 2120 may support the functionality described in reference to correspondingly named components earlier in this disclosure.

The data storage 2120 may further store various types of data utilized by components of the computing device 2100. Any data stored in the data storage 2120 may be loaded into the memory 2104 for use by the processor(s) 2102 in executing computer-executable code. In addition, any data depicted as being stored in the data storage 2120 may potentially be stored in one or more datastore(s) and may be accessed via the DBMS 2124 and loaded in the memory 2104 for use by the processor(s) 2102 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 21, the datastore(s) may include, for example, purchase history information, user action information, user profile information, a database linking search queries and user actions, and other information.

The processor(s) 2102 may be configured to access the memory 2104 and execute computer-executable instructions loaded therein. For example, the processor(s) 2102 may be configured to execute computer-executable instructions of the various program module(s), applications, engines, or the like of the computing device 2100 to cause or facilitate various operations to be performed in accordance with one or more embodiments of the disclosure. The processor(s) 2102 may include any suitable processing unit capable of accepting data as input, processing the input data in accordance with stored computer-executable instructions, and generating output data. The processor(s) 2102 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 2102 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 2102 may be capable of supporting any of a variety of instruction sets.

Referring now to functionality supported by the various program module(s) depicted in FIG. 21, the TLM module(s) 2126 may include computer-executable instructions, code, or the like that responsive to execution by one or more of the processor(s) 2102 may perform functions including, but not limited to, performing any functionality associated with the TLM devices, the TLM platform, etc.

Referring now to other illustrative components depicted as being stored in the data storage 2120, the O/S 2122 may be loaded from the data storage 2120 into the memory 2104 and may provide an interface between other application software executing on the computing device 2100 and the hardware resources of the computing device 2100. More specifically, the O/S 2122 may include a set of computer-executable instructions for managing the hardware resources of the computing device 2100 and for providing common services to other application programs (e.g., managing memory allocation among various application programs). In certain example embodiments, the O/S 2122 may control execution of the other program module(s) to dynamically enhance characters for content rendering. The O/S 2122 may include any operating system now known or which may be developed in the future including, but not limited to, any server operating system, any mainframe operating system, or any other proprietary or non-proprietary operating system.

The DBMS 2124 may be loaded into the memory 2104 and may support functionality for accessing, retrieving, storing, and/or manipulating data stored in the memory 2104 and/or data stored in the data storage 2120. The DBMS 2124 may use any of a variety of database models (e.g., relational model, object model, etc.) and may support any of a variety of query languages. The DBMS 2124 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 2100 is a mobile device, the DBMS 2124 may be any suitable light-weight DBMS optimized for performance on a mobile device.

Referring now to other illustrative components of the computing device 2100, the input/output (I/O) interface(s) 2106 may facilitate the receipt of input information by the computing device 2100 from one or more I/O devices as well as the output of information from the computing device 2100 to the one or more I/O devices. The I/O devices may include any of a variety of components, such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 2100 or may be separate. The I/O devices may further include, for example, any number of peripheral devices such as data storage devices, printing devices, and so forth.

The I/O interface(s) 2106 may also include an interface for an external peripheral device connection such as universal serial bus (USB), FireWire, Thunderbolt, Ethernet port or other connection protocol that may connect to one or more networks. The I/O interface(s) 2106 may also include a connection to one or more of the antenna(e) 2134 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 2100 may further include one or more network interface(s) 2108 via which the computing device 2100 may communicate with any of a variety of other systems, platforms, networks, devices, and so forth. The network interface(s) 2108 may enable communication, for example, with one or more wireless routers, one or more host servers, one or more web servers, and the like via one or more of networks.

The antenna(e) 2134 may include any suitable type of antenna depending, for example, on the communications protocols used to transmit or receive signals via the antenna (e) 2134. Non-limiting examples of suitable antennas may include directional antennas, non-directional antennas, dipole antennas, folded dipole antennas, patch antennas, multiple-input multiple-output (MIMO) antennas, or the like. The antenna(e) 2134 may be communicatively coupled to one or more transceivers 2112 or radio components to which or from which signals may be transmitted or received.

As previously described, the antenna(e) 2134 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 2134 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 2134 may be configured to transmit or receive radio frequency signals within any suitable frequency range forming part of the unlicensed portion of the radio spectrum.

The antenna(e) 2134 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 2112 may include any suitable radio component(s) for—in cooperation with the antenna(e) 2134—transmitting or receiving radio frequency (RF) signals in the bandwidth and/or channels corresponding to the communications protocols utilized by the computing device 2100 to communicate with other devices. The transceiver(s) 2112 may include hardware, software, and/or firmware for modulating, transmitting, or receiving—potentially in cooperation with any of antenna(e) 2134—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 2112 may further include hardware, firmware, or software for receiving GNSS signals. The transceiver(s) 2112 may include any known receiver and baseband suitable for communicating via the communications protocols utilized by the computing device 2100. The transceiver(s) 2112 may further include a low noise amplifier (LNA), additional signal amplifiers, an analog-to-digital (A/D) converter, one or more buffers, a digital baseband, or the like.

The sensor(s)/sensor interface(s) 2110 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 2114 may be any device configured to generate audible sound. The optional microphone(s) 2116 may be any device configured to receive analog sound input or voice data.

It should be appreciated that the program module(s), applications, computer-executable instructions, code, or the like depicted in FIG. 21 as being stored in the data storage 2120 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 2100, and/or hosted on other computing device(s) accessible via one or more networks, may be provided to support functionality provided by the program module(s), applications, or computer-executable code depicted in FIG. 21 and/or additional or alternate functionality. Further, functionality may be modularized differently such that processing described as being supported collectively by the collection of program module(s) depicted in FIG. 21 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 21 may be implemented, at least partially, in hardware and/or firmware across any number of devices.

It should further be appreciated that the computing device 2100 may include alternate and/or additional hardware, software, or firmware components beyond those described or depicted without departing from the scope of the disclosure. More particularly, it should be appreciated that software, firmware, or hardware components depicted as forming part of the computing device 2100 are merely illustrative and that some components may not be present or additional components may be provided in various embodiments. While various illustrative program module(s) have been depicted and described as software module(s) stored in data storage 2120, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
   a processor; and
   memory storing computer-executable instructions, that when executed by the processor, cause the processor to:
   receive, from a first tank level monitor (TLM) device disposed on a first fuel tank and at a first time, a first fuel level of the first fuel tank;
   receive, from a second TLM device disposed on a second fuel tank, a second fuel level of the second fuel tank;
   determine that the first fuel level is less than or equal to a threshold fuel level and the second fuel level is above the threshold fuel level; and
   automatically generate, a refueling schedule associated with that includes the first fuel tank instead of the second fuel tank.

2. The system of claim 1, wherein the computer-executable instructions further cause the processor to:
   predict a third fuel level of the second fuel tank at a second time;
   determine that the third fuel level will be below the threshold fuel level at the second time; and
   automatically schedule, based on determining that the third fuel level will be below the threshold fuel level at the second time, a second refueling event for the second fuel tank.

3. The system of claim 2, wherein the computer-executable instructions further cause the processor to:
   generate a first alert to present to a user through a user interface, wherein the first alert indicates that the first fuel level is less than or equal to the threshold fuel level or indicates that the third fuel level will be below the threshold fuel level at the second time.

4. The system of claim 3, wherein the user interface is displayed on through a mobile device or desktop application.

5. The system of claim 1, wherein the computer-executable instructions further cause the processor to:

receive, during an installation process of the TLM device with the first fuel tank, a first identifier associated with the TLM device;
receive, during the installation process, a second identifier associated with the TLM device; and
store an indication of an association between the TLM device and the first fuel tank.

6. The system of claim 1, wherein the computer-executable instructions further cause the processor to:
   receive accelerometer data from an accelerometer of the first TLM device;
   determine, based on the accelerometer data, that the first TLM device has been removed from the first fuel tank; and
   generate a second alert to present to a user through a user interface, wherein the second alert indicates that the first TLM device has been removed from the first fuel tank.

7. The system of claim 1, wherein the first fuel level and second fuel level are received over a narrowband Internet of Things (NB-IoT) network.

8. A method comprising:
   receiving, by a remote server and from a first tank level monitor (TLM) device disposed on a first fuel tank and at a first time, a first fuel level of the first fuel tank;
   receiving, from a second TLM device disposed on a second fuel tank, a second fuel level of the second fuel tank;
   determining that the first fuel level is less than or equal to a threshold fuel level and the second fuel level is above the threshold fuel level; and
   automatically generating, a refueling schedule associated with that includes the first fuel tank instead of the second fuel tank.

9. The method of claim 8, further comprising:
   predicting a third fuel level of the second fuel tank at a second time;
   determining that the third fuel level will be below the threshold fuel level at the second time; and
   automatically scheduling, based on determining that the third fuel level will be below the threshold fuel level at the second time, a second refueling event for the second fuel tank.

10. The method of claim 9, further comprising:
    generating a first alert to present to a user through a user interface, wherein the first alert indicates that the first fuel level is less than or equal to the threshold fuel level or indicates that the third fuel level will be below the threshold fuel level at the second time.

11. The method of claim 10, wherein the user interface is displayed through a mobile device or desktop application.

12. The method of claim 8, further comprising:
    receiving, during an installation process of the TLM device with the first fuel tank, a first identifier associated with the TLM device;
    receiving, during the installation process, a second identifier associated with the TLM device; and
    storing an indication of an association between the TLM device and the first fuel tank.

13. The method of claim 8, further comprising:
    receiving accelerometer data from an accelerometer of the first TLM device;
    determining, based on the accelerometer data, that the first TLM device has been removed from the first fuel tank; and generating a second alert to present to a user through a user interface, wherein the second alert indicates that the first TLM device has been removed from the first fuel tank.

\* \* \* \* \*